US012622353B2

(12) United States Patent
Vandike et al.

(10) Patent No.: US 12,622,353 B2
(45) Date of Patent: May 12, 2026

(54) PREDICTIVE SPEED MAP GENERATION AND CONTROL SYSTEM

(71) Applicant: Deere & Company, Moline, IL (US)

(72) Inventors: Nathan R. Vandike, Geneseo, IL (US); Bhanu Kiran Reddy Palla, Bettendorf, IA (US); Federico Pardina-Malbran, Fort Collins, CO (US); Noel W. Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/536,883

(22) Filed: Dec. 12, 2023

(65) Prior Publication Data

US 2024/0122103 A1 Apr. 18, 2024

Related U.S. Application Data

(63) Continuation of application No. 17/067,183, filed on Oct. 9, 2020, now Pat. No. 11,889,787.

(51) Int. Cl.
| | |
|---|---|
| *A01D 41/02* | (2006.01) |
| *A01D 41/127* | (2006.01) |
| *A01D 41/14* | (2006.01) |
| *G05D 1/00* | (2006.01) |
| *G05D 1/243* | (2024.01) |

(Continued)

(52) U.S. Cl.
CPC ......... *A01D 41/02* (2013.01); *A01D 41/1277* (2013.01); *A01D 41/141* (2013.01); *G05D 1/0223* (2013.01); *G05D 1/0274* (2013.01); *G05D 1/0278* (2013.01); *G05D 1/243* (2024.01); *G05D 1/248* (2024.01); *G05D 1/65* (2024.01)

(58) Field of Classification Search
CPC .. A01D 41/02; A01D 41/1277; A01D 41/141; G05D 1/65; G05D 1/248; G05D 1/243; G05D 1/0223; G05D 1/0274; G05D 1/0278
See application file for complete search history.

(56) References Cited

U.S. PATENT DOCUMENTS

| | | | |
|---|---|---|---|
| 9,140,824 B1 | 9/2015 | Mewes et al. | |
| 2015/0302305 A1* | 10/2015 | Rupp .................... | G06Q 50/02 |
| | | | 706/46 |

(Continued)

FOREIGN PATENT DOCUMENTS

| | | |
|---|---|---|
| CN | 110352697 A | 10/2019 |

*Primary Examiner* — Navid Z. Mehdizadeh
*Assistant Examiner* — Matthew Ho
(74) *Attorney, Agent, or Firm* — Christopher J. Volkmann; KELLY, HOLT & CHRISTENSON PLLC

(57) ABSTRACT

One or more information maps are obtained by an agricultural work machine. The one or more information maps map one or more agricultural characteristic values at different geographic locations of a field. An in-situ sensor on the agricultural work machine senses an agricultural characteristic as the agricultural work machine moves through the field. A predictive map generator generates a predictive map that predicts a predictive agricultural characteristic at different locations in the field based on a relationship between the values in the one or more information maps and the agricultural characteristic sensed by the in-situ sensor. The predictive map can be output and used in automated machine control.

20 Claims, 11 Drawing Sheets

(51) Int. Cl.
   *G05D 1/248* (2024.01)
   *G05D 1/65* (2024.01)

(56) References Cited

U.S. PATENT DOCUMENTS

| | | | | |
|---|---|---|---|---|
| 2016/0071410 | A1* | 3/2016 | Rupp | G08G 1/00 |
| | | | | 701/50 |
| 2017/0089742 | A1 | 3/2017 | Bruns et al. | |
| 2018/0092295 | A1* | 4/2018 | Sugumaran | A01C 14/00 |
| 2020/0128734 | A1 | 4/2020 | Brammeier et al. | |
| 2020/0156470 | A1* | 5/2020 | Stanhope | A01B 79/02 |

\* cited by examiner

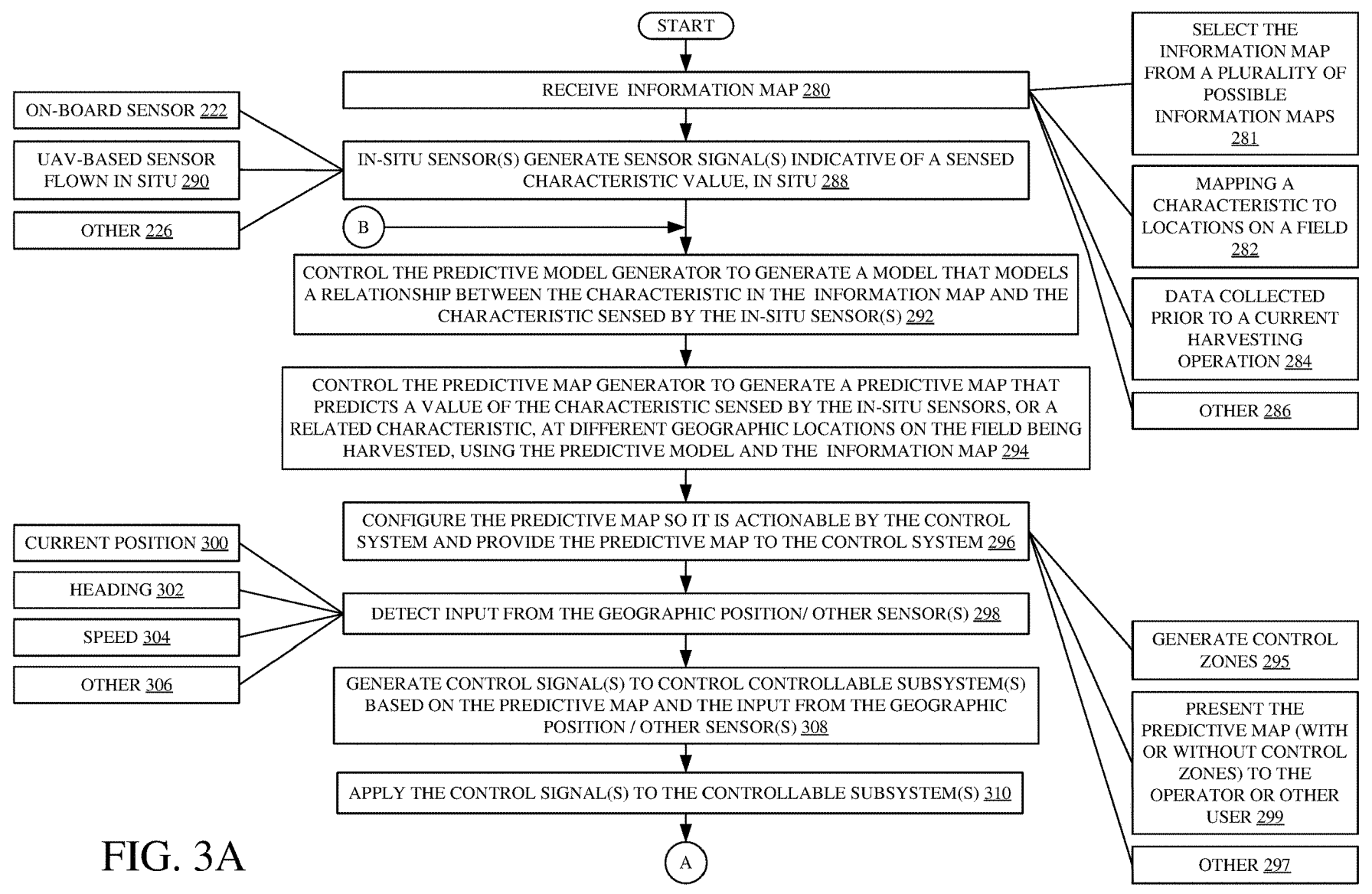

SELECT THE INFORMATION MAP FROM A PLURALITY OF POSSIBLE INFORMATION MAPS 281

MAPPING A CHARACTERISTIC TO LOCATIONS ON A FIELD 282

DATA COLLECTED PRIOR TO A CURRENT HARVESTING OPERATION 284

OTHER 286

GENERATE CONTROL ZONES 295

PRESENT THE PREDICTIVE MAP (WITH OR WITHOUT CONTROL ZONES) TO THE OPERATOR OR OTHER USER 299

OTHER 297

START

RECEIVE INFORMATION MAP 280

IN-SITU SENSOR(S) GENERATE SENSOR SIGNAL(S) INDICATIVE OF A SENSED CHARACTERISTIC VALUE, IN SITU 288

B

CONTROL THE PREDICTIVE MODEL GENERATOR TO GENERATE A MODEL THAT MODELS A RELATIONSHIP BETWEEN THE CHARACTERISTIC IN THE INFORMATION MAP AND THE CHARACTERISTIC SENSED BY THE IN-SITU SENSOR(S) 292

CONTROL THE PREDICTIVE MAP GENERATOR TO GENERATE A PREDICTIVE MAP THAT PREDICTS A VALUE OF THE CHARACTERISTIC SENSED BY THE IN-SITU SENSORS, OR A RELATED CHARACTERISTIC, AT DIFFERENT GEOGRAPHIC LOCATIONS ON THE FIELD BEING HARVESTED, USING THE PREDICTIVE MODEL AND THE INFORMATION MAP 294

CONFIGURE THE PREDICTIVE MAP SO IT IS ACTIONABLE BY THE CONTROL SYSTEM AND PROVIDE THE PREDICTIVE MAP TO THE CONTROL SYSTEM 296

DETECT INPUT FROM THE GEOGRAPHIC POSITION/ OTHER SENSOR(S) 298

GENERATE CONTROL SIGNAL(S) TO CONTROL CONTROLLABLE SUBSYSTEM(S) BASED ON THE PREDICTIVE MAP AND THE INPUT FROM THE GEOGRAPHIC POSITION / OTHER SENSOR(S) 308

APPLY THE CONTROL SIGNAL(S) TO THE CONTROLLABLE SUBSYSTEM(S) 310

A

ON-BOARD SENSOR 222

UAV-BASED SENSOR FLOWN IN SITU 290

OTHER 226

CURRENT POSITION 300

HEADING 302

SPEED 304

OTHER 306

FIG. 3A

PREDICTIVE SPEED MAP GENERATION AND CONTROL SYSTEM

CROSS-REFERENCE TO RELATED APPLICATION

The present application is a continuation of and claims priority of U.S. patent application Ser. No. 17/067,183, filed Oct. 9, 2020, the content of which is hereby incorporated by reference in its entirety.

FIELD OF THE DESCRIPTION

The present description relates to agricultural machines, forestry machines, construction machines and turf management machines.

BACKGROUND

There are a wide variety of different types of agricultural machines. Some agricultural machines include harvesters, such as combine harvesters, sugar cane harvesters, cotton harvesters, self-propelled forage harvesters, and windrowers. Some harvester can also be fitted with different types of heads to harvest different types of crops.

A variety of different conditions in fields have a number of deleterious effects on the harvesting operation. Therefore, an operator may attempt to modify control of the harvester, upon encountering such conditions during the harvesting operation.

The discussion above is merely provided for general background information and is not intended to be used as an aid in determining the scope of the claimed subject matter.

SUMMARY

One or more information maps are obtained by an agricultural work machine. The one or more information maps map one or more agricultural characteristic values at different geographic locations of a field. An in-situ sensor on the agricultural work machine senses an agricultural characteristic as the agricultural work machine moves through the field. A predictive map generator generates a predictive map that predicts a predictive agricultural characteristic at different locations in the field based on a relationship between the values in the one or more information maps and the agricultural characteristic sensed by the in-situ sensor. The predictive map can be output and used in automated machine control.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to examples that solve any or all disadvantages noted in the background.

BRIEF DESCRIPTION OF THE DRAWINGS

FIGS. 3A-3B (collectively referred to herein as FIG. 3) show a flow diagram illustrating an example of operation of an agricultural harvester in generating a map.

DETAILED DESCRIPTION

Figure 1:
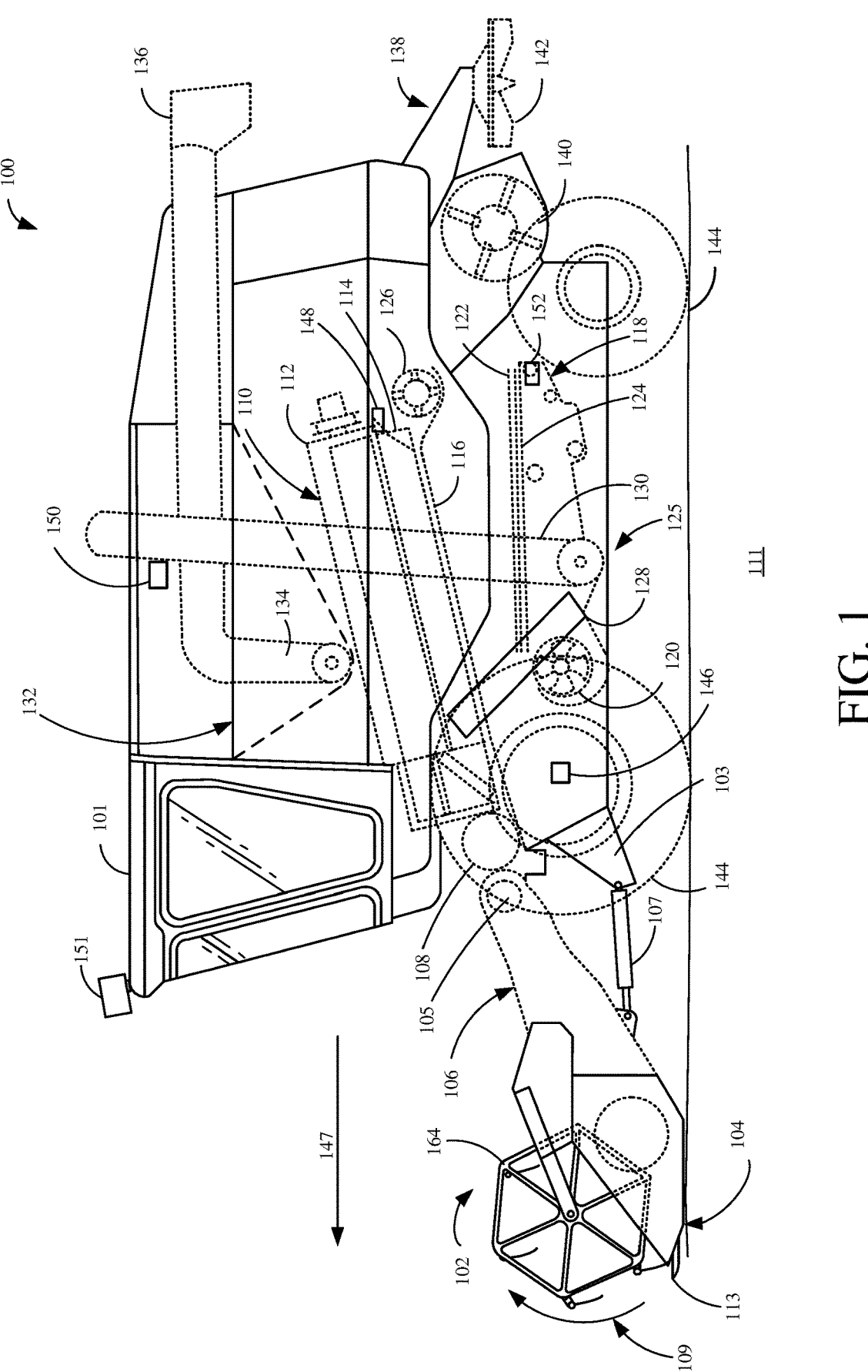
FIG. 1 is a partial pictorial, partial schematic illustration of one example of a combine harvester.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

The present description relates to using in-situ data taken concurrently with an agricultural operation, in combination with prior data, to generate a predictive map and, more particularly, a predictive speed map. In some examples, the predictive speed map can be used to control an agricultural work machine, such as an agricultural harvester. As discussed above, it may improve the performance of the agricultural harvester to control the speed of the agricultural harvester when the agricultural harvester engages different conditions in the field. For instance, if the crops have reached maturity, the weeds may still be green, thus increasing the moisture content of the biomass that is encountered by the agricultural harvester. This problem may be exacerbated when the weed patches are wet (such as shortly after a rainfall or when weed patches contain dew) and before the weeds have had a chance to dry. Thus, when the agricultural harvester encounters an area of increased biomass, the operator may slow the speed of the agricultural harvester to maintain a constant feed rate of material through the agricultural harvester. Maintaining a constant feed rate may maintain the performance of the agricultural harvester.

Performance of an agricultural harvester may be deleteriously affected based on a number of different criteria. Such different criteria may include changes in biomass, crop state, topography, soil properties, and seeding characteristics, or other conditions. Therefore, it may also be useful to control the speed of the agricultural harvester based on other conditions that may be present in the field. For example, the performance of the agricultural harvester may be maintained at an acceptable level by controlling the speed of the agricultural harvester based on the biomass encountered by the agricultural harvester, the crop state of the crop being harvested, the topography of the field being harvested, soil properties of soil in the field being harvested, seeding characteristics in the field being harvested, yield in the field being harvested, or other conditions that are present in the field.

Some current systems provide vegetative index maps. A vegetative index map illustratively maps vegetative index values (which may be indicative of vegetative growth) across different geographic locations in a field of interest. One example of a vegetative index includes a normalized difference vegetation index (NDVI). There are many other vegetative indices that are within the scope of the present disclosure. In some examples, a vegetative index may be derived from sensor readings of one or more bands of electromagnetic radiation reflected by the plants. Without limitations, these bands may be in the microwave, infrared, visible or ultraviolet portions of the electromagnetic spectrum.

A vegetative index map can be used to identify the presence and location of vegetation. In some examples, these maps enable vegetation to be identified and georeferenced in the presence of bare soil, crop residue, or other plants, including crop or other weeds.

In some examples, a biomass map is provided. A biomass map illustratively maps a measure of biomass in the field being harvested at different locations in the field. A biomass map may be generated from vegetative index values, from historically measured or estimated biomass levels, from images or other sensor readings taken during a previous operation in the field, or in other ways. In some examples, biomass may be adjusted by a factor representing a portion of total biomass passing through the agricultural harvester. For corn, this factor is typically around 50%. In some examples, this factor may vary based on crop moisture. In some examples, the factor may represent a portion of weed material or weed seeds. In some examples, the factor may represent a portion of one crop in an intercrop mix.

In some examples, a crop state map is provided. Crop state may define whether the crop is down, standing, partially down, the orientation of down or partially down crop relative to the ground surface or to a compass direction, and other things. A crop state map illustratively maps the crop state in the field being harvested at different locations in the field. A crop state map may be generated from aerial or other images of the field, from images or other sensor readings taken during a prior operation in the field or in other ways prior to harvesting.

In some examples, a seeding map is provided. A seeding map may map seeding characteristics such as seed locations, seed variety, or seed population to different locations in the field. The seeding map may be generated during a past seed planting operation in the field. The seeding map may be derived from control signals used by a seeder when planting seeds or from sensors on the seeder that confirm that a seed was metered or planted. Seeders may also include geographic position sensors that geolocate the seed characteristics on the field.

In some examples, a soil property map is provided. A soil property map illustratively maps a measure of one or more soil properties such as soil type, soil chemical constituents, soil structure, residue coverage, tillage history, or soil moisture in the field being harvested at different locations in the field. A soil properties map may be generated from vegetative index values, from historically measured or estimated soil properties, from images or other sensor readings taken during a previous operation in the field, or in other ways.

In some examples, other information maps are provided. Such information maps can include a topographic map of the field being harvested, a predictive yield map for the field being harvested, or other information maps.

The present discussion thus proceeds with respect to systems that receive an information map of a field or map generated during a prior operation and also use an in-situ sensor to detect a variable indicative of one or more of a machine speed and an output from a feed rate control system. The systems generate a model that models a relationship between the information values on the information map and the output values from the in-situ sensor. The model is used to generate a functional predictive speed map that predicts, for example, an expected machine speed at different locations in the field. The functional predictive speed map, generated during the harvesting operation, can be presented to an operator or other user or used in automatically controlling an agricultural harvester during the harvesting operation, or both.

FIG. 1 is a partial pictorial, partial schematic, illustration of a self-propelled agricultural harvester 100. In the illustrated example, agricultural harvester 100 is a combine harvester. Further, although combine harvesters are provided as examples throughout the present disclosure, it will be appreciated that the present description is also applicable to other types of harvesters, such as cotton harvesters, sugarcane harvesters, self-propelled forage harvesters, windrowers, or other agricultural work machines. Consequently, the present disclosure is intended to encompass the various types of harvesters described and is, thus, not limited to combine harvesters. Moreover, the present disclosure is directed to other types of work machines, such as agricultural seeders and sprayers, construction equipment, forestry equipment, and turf management equipment where generation of a predictive map may be applicable. Consequently, the present disclosure is intended to encompass these various types of harvesters and other work machines and is, thus, not limited to combine harvesters.

As shown in FIG. 1, agricultural harvester 100 illustratively includes an operator compartment 101, which can have a variety of different operator interface mechanisms, for controlling agricultural harvester 100. Agricultural harvester 100 includes front-end equipment, such as a header 102, and a cutter generally indicated at 104. Agricultural harvester 100 also includes a feeder house 106, a feed accelerator 108, and a thresher generally indicated at 110. The feeder house 106 and the feed accelerator 108 form part of a material handling subsystem 125. Header 102 is pivotally coupled to a frame 103 of agricultural harvester 100 along pivot axis 105. One or more actuators 107 drive movement of header 102 about axis 105 in the direction generally indicated by arrow 109. Thus, a vertical position of header 102 (the header height) above ground 111 over which the header 102 travels is controllable by actuating actuator 107. While not shown in FIG. 1, agricultural harvester 100 may also include one or more actuators that operate to apply a tilt angle, a roll angle, or both to the header 102 or portions of header 102. Tilt refers to an angle at which the cutter 104 engages the crop. The tilt angle is increased, for example, by controlling header 102 to point a distal edge 113 of cutter 104 more toward the ground. The tilt angle is decreased by controlling header 102 to point the distal edge 113 of cutter 104 more away from the ground.

The roll angle refers to the orientation of header 102 about the front-to-back longitudinal axis of agricultural harvester 100.

Thresher 110 illustratively includes a threshing rotor 112 and a set of concaves 114. Further, agricultural harvester 100 also includes a separator 116. Agricultural harvester 100 also includes a cleaning subsystem or cleaning shoe (collectively referred to as cleaning subsystem 118) that includes a cleaning fan 120, chaffer 122, and sieve 124. The material handling subsystem 125 also includes discharge beater 126, tailings elevator 128, clean grain elevator 130, as well as unloading auger 134 and spout 136. The clean grain elevator moves clean grain into clean grain tank 132. Agricultural harvester 100 also includes a residue subsystem 138 that can include chopper 140 and spreader 142. Agricultural harvester 100 also includes a propulsion subsystem that includes an engine that drives ground engaging components 144, such as wheels or tracks. In some examples, a combine harvester within the scope of the present disclosure may have more than one of any of the subsystems mentioned above. In some examples, agricultural harvester 100 may have left and right cleaning subsystems, separators, etc., which are not shown in FIG. 1.

In operation, and by way of overview, agricultural harvester 100 illustratively moves through a field in the direction indicated by arrow 147. As agricultural harvester 100 moves, header 102 (and the associated reel 164) engages the crop to be harvested and gathers the crop toward cutter 104. An operator of agricultural harvester 100 can be a local human operator, a remote human operator, or an automated system. The operator of agricultural harvester 100 may determine one or more of a height setting, a tilt angle setting, or a roll angle setting for header 102. For example, the operator inputs a setting or settings to a control system, described in more detail below, that controls actuator 107. The control system may also receive a setting from the operator for establishing the tilt angle and roll angle of the header 102 and implement the inputted settings by controlling associated actuators, not shown, that operate to change the tilt angle and roll angle of the header 102. The actuator 107 maintains header 102 at a height above ground 111 based on a height setting and, where applicable, at desired tilt and roll angles. Each of the height, roll, and tilt settings may be implemented independently of the others. The control system responds to header error (e.g., the difference between the height setting and measured height of header 104 above ground 111 and, in some examples, tilt angle and roll angle errors) with a responsiveness that is determined based on a selected sensitivity level. If the sensitivity level is set at a greater level of sensitivity, the control system responds to smaller header position errors, and attempts to reduce the detected errors more quickly than when the sensitivity is at a lower level of sensitivity.

Returning to the description of the operation of agricultural harvester 100, after crops are cut by cutter 104, the severed crop material is moved through a conveyor in feeder house toward feed accelerator 108, which accelerates the crop material into thresher 110. The crop material is threshed by rotor 112 rotating the crop against concaves 114. The threshed crop material is moved by a separator rotor in separator 116 where a portion of the residue is moved by discharge beater 126 toward the residue subsystem 138. The portion of residue transferred to the residue subsystem 138 is chopped by residue chopper 140 and spread on the field by spreader 142. In other configurations, the residue is released from the agricultural harvester 100 in a windrow. In other examples, the residue subsystem 138 can include weed seed eliminators (not shown) such as seed baggers or other seed collectors, or seed crushers or other seed destroyers.

Grain falls to cleaning subsystem 118. Chaffer 122 separates some larger pieces of material from the grain, and sieve 124 separates some of finer pieces of material from the clean grain. Clean grain falls to an auger that moves the grain to an inlet end of clean grain elevator 130, and the clean grain elevator 130 moves the clean grain upwards, depositing the clean grain in clean grain tank 132. Residue is removed from the cleaning subsystem 118 by airflow generated by cleaning fan 120. Cleaning fan 120 directs air along an airflow path upwardly through the sieves and chaffers. The airflow carries residue rearwardly in agricultural harvester 100 toward the residue handling subsystem 138.

Tailings elevator 128 returns tailings to thresher 110 where the tailings are re-threshed. Alternatively, the tailings also may be passed to a separate re-threshing mechanism by a tailings elevator or another transport device where the tailings are re-threshed as well.

FIG. 1 also shows that, in one example, agricultural harvester 100 includes machine speed sensor 146, one or more separator loss sensors 148, a clean grain camera 150, a forward looking image capture mechanism 151, which may be in the form of a stereo or mono camera, and one or more loss sensors 152 provided in the cleaning subsystem 118.

Machine speed sensor 146 senses the travel speed of agricultural harvester 100 over the ground. Machine speed sensor 146 may sense the travel speed of the agricultural harvester 100 by sensing the speed of rotation of the ground engaging components (such as wheels or tracks), a drive shaft, an axel, or other components. In some instances, the travel speed may be sensed using a positioning system, such as a global positioning system (GPS), a dead reckoning system, a long range navigation (LORAN) system, or a wide variety of other systems or sensors that provide an indication of travel speed.

Loss sensors 152 illustratively provide an output signal indicative of the quantity of grain loss occurring in both the right and left sides of the cleaning subsystem 118. In some examples, sensors 152 are strike sensors which count grain strikes per unit of time or per unit of distance traveled to provide an indication of the grain loss occurring at the cleaning subsystem 118. The strike sensors for the right and left sides of the cleaning subsystem 118 may provide individual signals or a combined or aggregated signal. In some examples, sensors 152 may include a single sensor as opposed to separate sensors provided for each cleaning subsystem 118.

Separator loss sensor 148 provides a signal indicative of grain loss in the left and right separators, not separately shown in FIG. 1. The separator loss sensors 148 may be associated with the left and right separators and may provide separate grain loss signals or a combined or aggregate signal. In some instances, sensing grain loss in the separators may also be performed using a wide variety of different types of sensors as well.

Agricultural harvester 100 may also include other sensors and measurement mechanisms. For instance, agricultural harvester 100 may include one or more of the following sensors: a header height sensor that senses a height of header 102 above ground 111; stability sensors that sense oscillation or bouncing motion (and amplitude) of agricultural harvester 100; a residue setting sensor that is configured to sense whether agricultural harvester 100 is configured to chop the residue, produce a windrow, etc.; a cleaning shoe fan speed sensor to sense the speed of fan 120; a concave clearance sensor that senses clearance between the rotor 112 and concaves 114; a threshing rotor speed sensor that senses a rotor speed of rotor 112; a chaffer clearance sensor that senses the size of openings in chaffer 122; a sieve clearance sensor that senses the size of openings in sieve 124; a material other than grain (MOG) moisture sensor that senses a moisture level of the MOG passing through agricultural harvester 100; one or more machine setting sensors configured to sense various configurable settings of agricultural harvester 100; a machine orientation sensor that senses the orientation of agricultural harvester 100; and crop property sensors that sense a variety of different types of crop properties, such as crop type, crop moisture, and other crop properties. Crop property sensors may also be configured to sense characteristics of the severed crop material as the crop material is being processed by agricultural harvester 100. For example, in some instances, the crop property sensors may sense grain quality such as broken grain, MOG levels; grain constituents such as starches and protein; and grain feed rate as the grain travels through the feeder house 106, clean grain elevator 130, or elsewhere in the agricultural harvester 100. The crop property sensors may also sense the feed rate of biomass through feeder house 106, through the separator 116 or elsewhere in agricultural harvester 100. The crop property sensors may also sense the feed rate as a mass flow rate of grain through elevator 130 or through other portions of the agricultural harvester 100 or provide other output signals indicative of other sensed variables.

Prior to describing how agricultural harvester 100 generates a functional predictive speed map, and uses the functional predictive speed map for control, a brief description of some of the items on agricultural harvester 100, and their operation, will first be described. The description of FIGS. 2 and 3 describe receiving a general type of information map and combining information from the information map with a georeferenced sensor signal generated by an in-situ sensor, where the sensor signal is indicative of a characteristic in the field, such as characteristics of the field itself, crop characteristics of crop or grain present in the field, or characteristics of the agricultural harvester. Characteristics of the field may include, but are not limited to, characteristics of a field such as slope, weed intensity, weed type, soil moisture, surface quality; characteristics of crop properties such as crop height, crop moisture, crop density, crop state; characteristics of grain properties such as grain moisture, grain size, grain test weight; and characteristics of machine operation such as machine speed, outputs from different controllers, machine performance such as loss levels, job quality, fuel consumption, and power utilization. A relationship between the characteristic values obtained from in-situ sensor signals or values derived therefrom and the information map values is identified, and that relationship is used to generate a new functional predictive map. A functional predictive map predicts values at different geographic locations in a field, and one or more of those values may be used for controlling a machine, such as one or more subsystems of an agricultural harvester. In some instances, a functional predictive map can be presented to a user, such as an operator of an agricultural work machine, which may be an agricultural harvester. A functional predictive map may be presented to a user visually, such as via a display, haptically, or audibly. The user may interact with the functional predictive map to perform editing operations and other user interface operations. In some instances, a functional predictive map can be used for one or more of controlling an agricultural work machine, such as an agricultural harvester, presentation to an operator or other user, and presentation to an operator or user for interaction by the operator or user.

Figure 2:
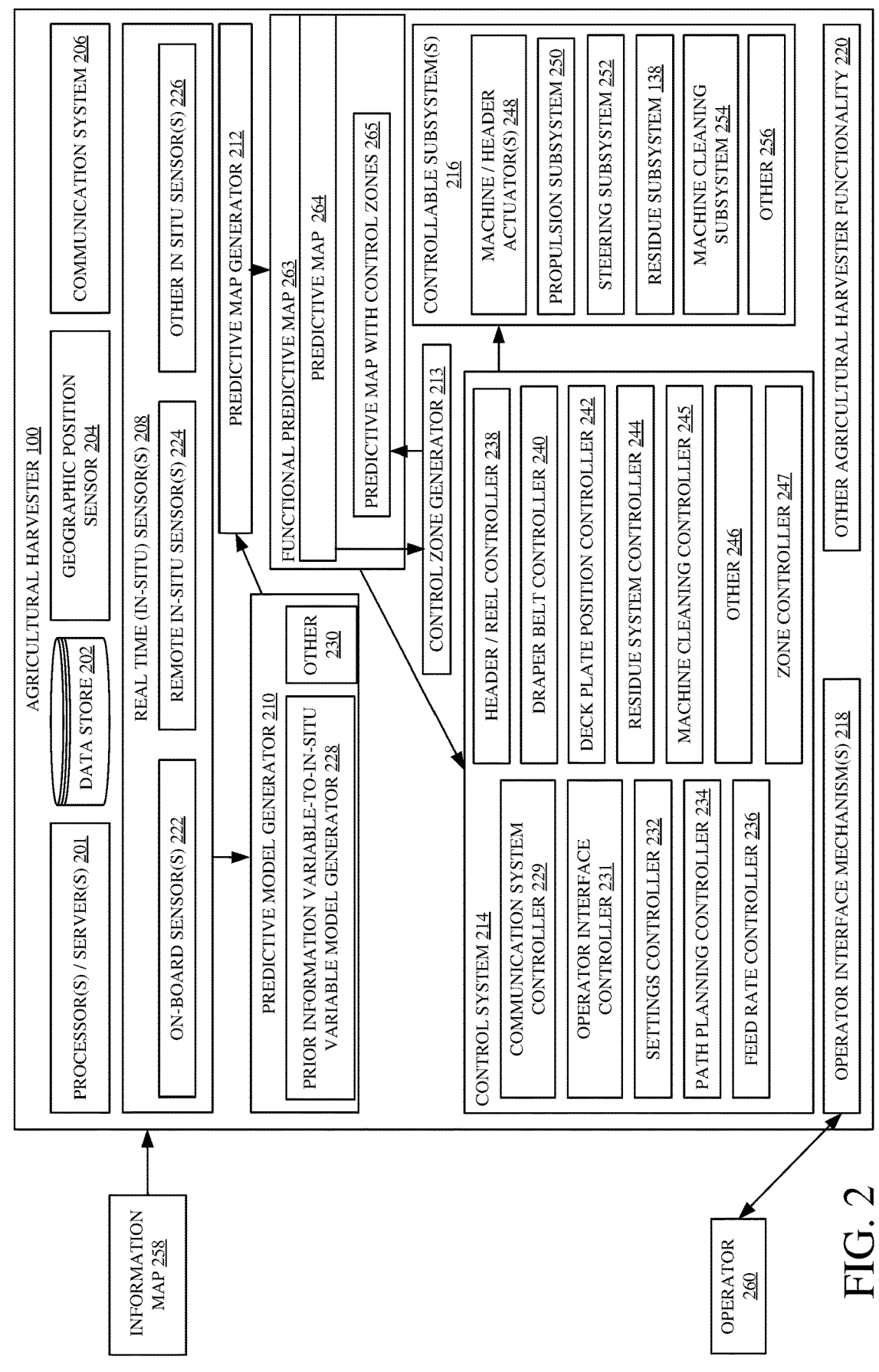
FIG. 2 is a block diagram showing some portions of an agricultural harvester in more detail, according to some examples of the present disclosure.
Figure 3B:
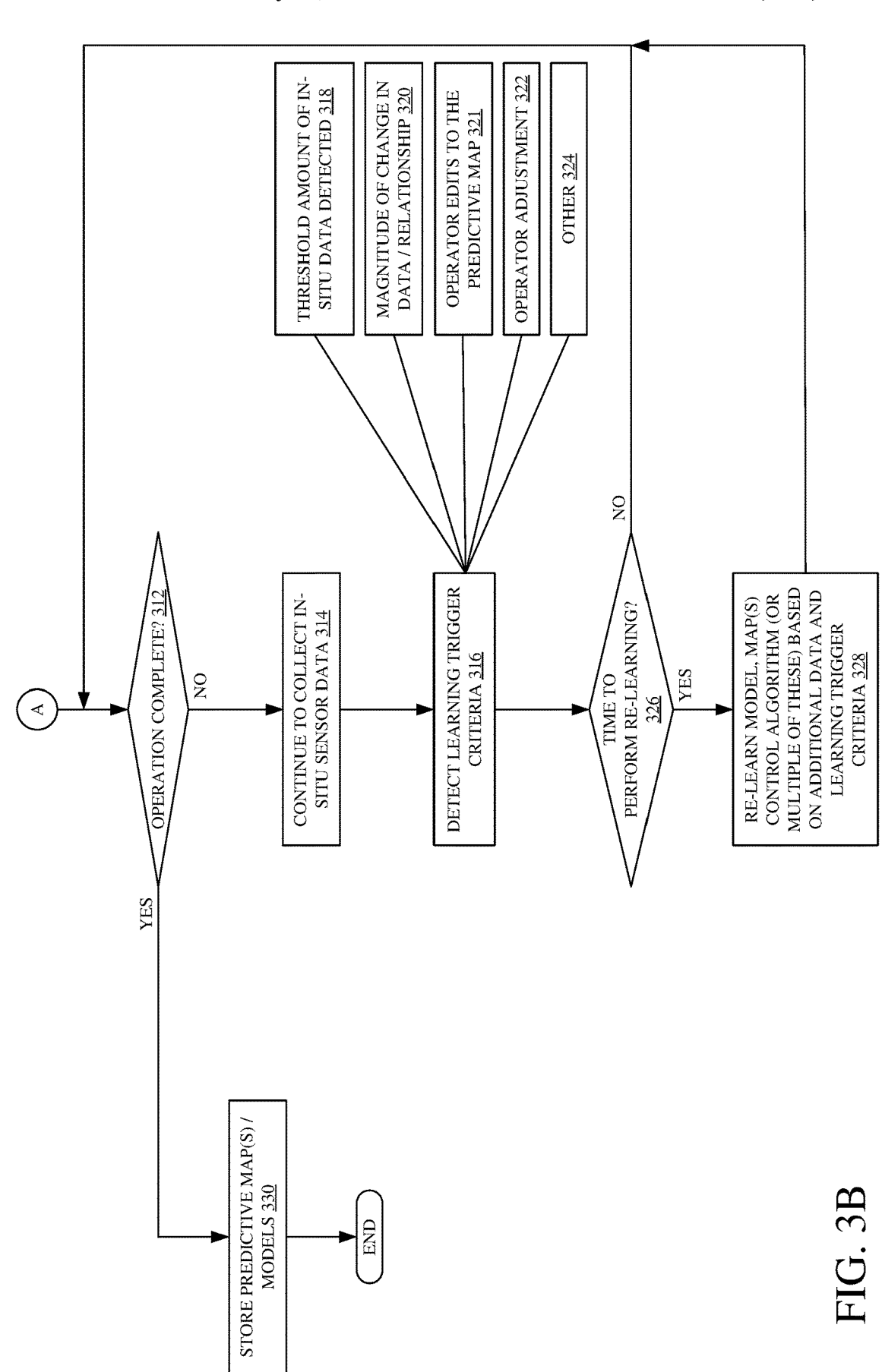
Figure 4:
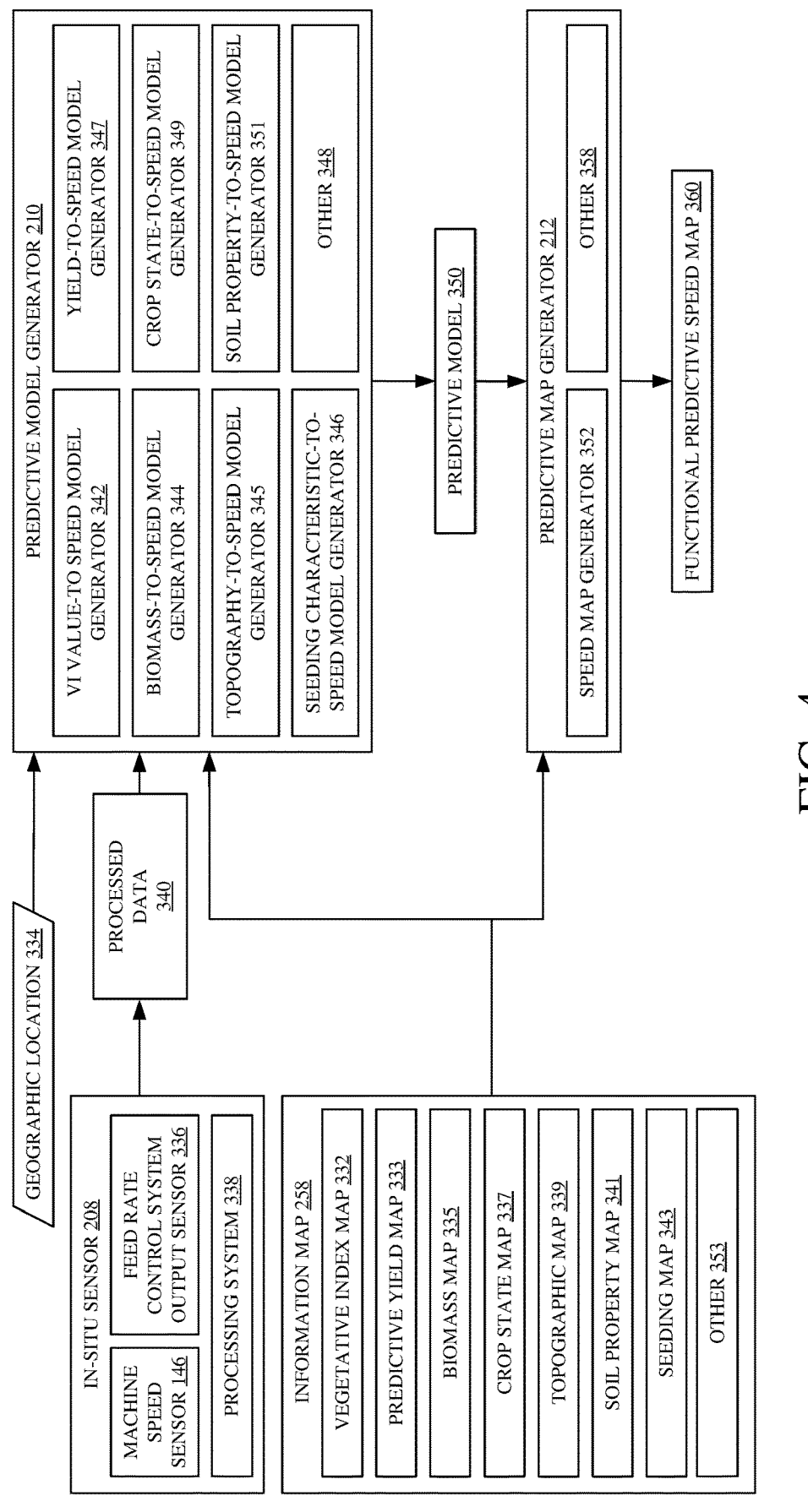
FIG. 4 is a block diagram showing one example of a predictive model generator and a predictive map generator.
Figure 5:
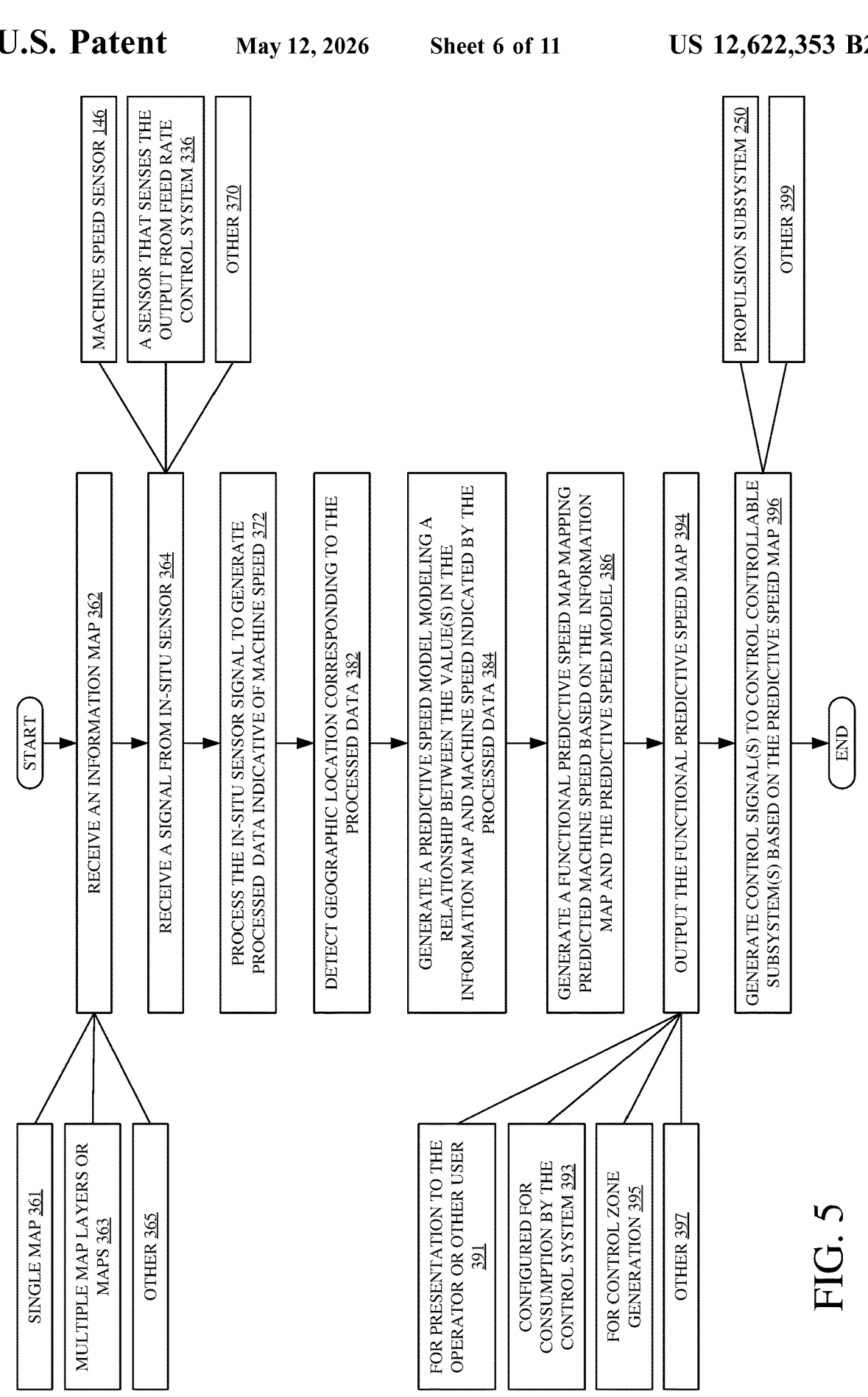
FIG. 5 is a flow diagram showing an example of operation of an agricultural harvester in receiving an information map, detecting a speed characteristic, and generating a functional predictive speed map for use in controlling the agricultural harvester during a harvesting operation.

After the general approach is described with respect to FIGS. 2 and 3, a more specific approach for generating a functional predictive speed map that can be presented to an operator or user, or used to control agricultural harvester 100, or both is described with respect to FIGS. 4 and 5. Again, while the present discussion proceeds with respect to the agricultural harvester and, particularly, a combine harvester, the scope of the present disclosure encompasses other types of agricultural harvesters or other agricultural work machines.

FIG. 2 is a block diagram showing some portions of an example agricultural harvester 100. FIG. 2 shows that agricultural harvester 100 illustratively includes one or more processors or servers 201, data store 202, geographic position sensor 204, communication system 206, and one or more in-situ sensors 208 that sense one or more agricultural characteristics of a field concurrent with a harvesting operation. An agricultural characteristic can include any characteristic that can have an effect of the harvesting operation. Some examples of agricultural characteristics include characteristics of the harvesting machine, the field, the plants on the field, and the weather. Other types of agricultural characteristics are also included. The in-situ sensors 208 generate values corresponding to the sensed characteristics. The agricultural harvester 100 also includes a predictive model or relationship generator (collectively referred to hereinafter as "predictive model generator 210"), predictive map generator 212, control zone generator 213, control system 214, one or more controllable subsystems 216, and an operator interface mechanism 218. The agricultural harvester 100 can also include a wide variety of other agricultural harvester functionality 220. The in-situ sensors 208 include, for example, on-board sensors 222, remote sensors 224, and other sensors 226 that sense characteristics of a field during the course of an agricultural operation. Predictive model generator 210 illustratively includes an information variable-to-in-situ variable model generator 228, and predictive model generator 210 can include other items 230. Control system 214 includes communication system controller 229, operator interface controller 231, a settings controller 232, path planning controller 234, feed rate controller 236, header and reel controller 238, draper belt controller 240, deck plate position controller 242, residue system controller 244, machine cleaning controller 245, zone controller 247, and system 214 can include other items 246. Controllable subsystems 216 include machine and header actuators 248, propulsion subsystem 250, steering subsystem 252, residue subsystem 138, machine cleaning subsystem 254, and subsystems 216 can include a wide variety of other subsystems 256.

FIG. 2 also shows that agricultural harvester 100 can receive information map 258. As described below, the information map 258 includes, for example, a vegetative index map, a biomass map, a crop state map, a topographic map, a soil property map, a seeding map, or a map from a prior operation. However, information map 258 may also encompass other types of data that were obtained prior to a harvesting operation or a map from a prior operation. FIG. 2 also shows that an operator 260 may operate the agricultural harvester 100. The operator 260 interacts with operator interface mechanisms 218. In some examples, operator interface mechanisms 218 may include joysticks, levers, a steering wheel, linkages, pedals, buttons, dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, operator 260 may interact with operator interface mechanisms 218 using touch gestures. These examples described above are provided as illustrative examples and are not intended to limit the scope of the present disclosure. Consequently, other types of operator interface mechanisms 218 may be used and are within the scope of the present disclosure.

Information map 258 may be downloaded onto agricultural harvester 100 and stored in data store 202, using communication system 206 or in other ways. In some examples, communication system 206 may be a cellular communication system, a system for communicating over a wide area network or a local area network, a system for communicating over a near field communication network, or a communication system configured to communicate over any of a variety of other networks or combinations of networks. Communication system 206 may also include a system that facilitates downloads or transfers of information to and from a secure digital (SD) card or a universal serial bus (USB) card or both.

Geographic position sensor 204 illustratively senses or detects the geographic position or location of agricultural harvester 100. Geographic position sensor 204 can include, but is not limited to, a global navigation satellite system (GNSS) receiver that receives signals from a GNSS satellite transmitter. Geographic position sensor 204 can also include a real-time kinematic (RTK) component that is configured to enhance the precision of position data derived from the GNSS signal. Geographic position sensor 204 can include a dead reckoning system, a cellular triangulation system, or any of a variety of other geographic position sensors.

In-situ sensors 208 may be any of the sensors described above with respect to FIG. 1. In-situ sensors 208 include on-board sensors 222 that are mounted on-board agricultural harvester 100. Such sensors may include, for instance, any of the sensors discussed above with respect to FIG. 1, a perception sensor (e.g., a forward looking mono or stereo camera system and image processing system), image sensors that are internal to agricultural harvester 100 (such as the clean grain camera or cameras mounted to identify material that is exiting agricultural harvester 100 through the residue subsystem or from the cleaning subsystem). The in-situ sensors 208 also include remote in-situ sensors 224 that capture in-situ information. In-situ data include data taken from a sensor on-board the harvester or taken by any sensor where the data are detected during the harvesting operation.

Predictive model generator 210 generates a model that is indicative of a relationship between the values sensed by the in-situ sensor 208 and a metric mapped to the field by the information map 258. For example, if the information map 258 maps a vegetative index value to different locations in the field, and the in-situ sensor 208 is sensing a value indicative of machine speed, then information variable-to-in-situ variable model generator 228 generates a predictive speed model that models the relationship between the vegetative index value and the machine speed value. The predictive speed model can also be generated based on vegetative index values from the information map 258 and multiple in-situ data values generated by in-situ sensors 208. Then, predictive map generator 212 uses the predictive speed model generated by predictive model generator 210 to generate a functional predictive speed map that predicts the expected machine speed sensed by the in-situ sensors 208 at different locations in the field based upon the information map 258.

In some examples, the type of values in the functional predictive map 263 may be the same as the in-situ data type sensed by the in-situ sensors 208. In some instances, the type of values in the functional predictive map 263 may have different units from the data sensed by the in-situ sensors 208. In some examples, the type of values in the functional predictive map 263 may be different from the data type sensed by the in-situ sensors 208 but have a relationship to the type of data type sensed by the in-situ sensors 208. For example, in some examples, the data type sensed by the in-situ sensors 208 may be indicative of the type of values in the functional predictive map 263. In some examples, the type of data in the functional predictive map 263 may be different than the data type in the information map 258. In some instances, the type of data in the functional predictive map 263 may have different units from the data in the information map 258. In some examples, the type of data in the functional predictive map 263 may be different from the data type in the information map 258 but has a relationship to the data type in the information map 258. For example, in some examples, the data type in the information map 258 may be indicative of the type of data in the functional predictive map 263. In some examples, the type of data in the functional predictive map 263 is different than one of, or both of the in-situ data type sensed by the in-situ sensors 208 and the data type in the information map 258. In some examples, the type of data in the functional predictive map 263 is the same as one of, or both of, of the in-situ data type sensed by the in-situ sensors 208 and the data type in information map 258. In some examples, the type of data in the functional predictive map 263 is the same as one of the in-situ data type sensed by the in-situ sensors 208 or the data type in the information map 258, and different than the other.

Continuing with the preceding example, in which information map 258 is a vegetative index map and in-situ sensor 208 senses a value indicative of machine speed, predictive map generator 212 can use the vegetative index values in information map 258 and the model generated by predictive model generator 210 to generate a functional predictive map 263 that predicts the expected machine speed at different locations in the field. Predictive map generator 212 thus outputs predictive map 264.

As shown in FIG. 2, predictive map 264 predicts the value of a sensed characteristic (sensed by in-situ sensors 208), or a characteristic related to the sensed characteristic, at various locations across the field based upon an information value in information map 258 at those locations and using the predictive model. For example, if predictive model generator 210 has generated a predictive model indicative of a relationship between a vegetative index value and machine speed, then, given the vegetative index value at different locations across the field, predictive map generator 212 generates a predictive map 264 that predicts the target machine speed value at different locations across the field. The vegetative index value, obtained from the vegetative index map, at those locations and the relationship between vegetative index value and machine speed, obtained from the predictive model, are used to generate the predictive map 264.

Some variations in the data types that are mapped in the information map 258, the data types sensed by in-situ sensors 208, and the data types predicted on the predictive map 264 will now be described.

In some examples, the data type in the information map 258 is different from the data type sensed by in-situ sensors 208, yet the data type in the predictive map 264 is the same as the data type sensed by the in-situ sensors 208. For instance, the information map 258 may be a vegetative index map, and the variable sensed by the in-situ sensors 208 may be yield. The predictive map 264 may then be a predictive yield map that maps predicted yield values to different geographic locations in the field. In another example, the information map 258 may be a vegetative index map, and the variable sensed by the in-situ sensors 208 may be crop height. The predictive map 264 may then be a predictive crop height map that maps predicted crop height values to different geographic locations in the field.

Also, in some examples, the data type in the information map 258 is different from the data type sensed by in-situ sensors 208, and the data type in the predictive map 264 is different from both the data type in the information map 258 and the data type sensed by the in-situ sensors 208. For instance, the information map 258 may be a vegetative index map, and the variable sensed by the in-situ sensors 208 may be crop height. The predictive map 264 may then be a predictive biomass map that maps predicted biomass values to different geographic locations in the field. In another example, the information map 258 may be a vegetative index map, and the variable sensed by the in-situ sensors 208 may be yield. The predictive map 264 may then be a predictive speed map that maps predicted harvester speed values to different geographic locations in the field.

In some examples, the information map 258 is from a prior pass through the field during a prior operation and the data type is different from the data type sensed by in-situ sensors 208, yet the data type in the predictive map 264 is the same as the data type sensed by the in-situ sensors 208. For instance, the information map 258 may be a seed population map generated during planting, and the variable sensed by the in-situ sensors 208 may be stalk size. The predictive map 264 may then be a predictive stalk size map that maps predicted stalk size values to different geographic locations in the field. In another example, the information map 258 may be a seeding hybrid map, and the variable sensed by the in-situ sensors 208 may be crop state such as standing crop or down crop. The predictive map 264 may then be a predictive crop state map that maps predicted crop state values to different geographic locations in the field.

In some examples, the information map 258 is from a prior pass through the field during a prior operation and the data type is the same as the data type sensed by in-situ sensors 208, and the data type in the predictive map 264 is also the same as the data type sensed by the in-situ sensors 208. For instance, the information map 258 may be a yield map generated during a previous year, and the variable sensed by the in-situ sensors 208 may be yield. The predictive map 264 may then be a predictive yield map that maps predicted yield values to different geographic locations in the field. In such an example, the relative yield differences in the georeferenced information map 258 from the prior year can be used by predictive model generator 210 to generate a predictive model that models a relationship between the relative yield differences on the information map 258 and the yield values sensed by in-situ sensors 208 during the current harvesting operation. The predictive model is then used by predictive map generator 210 to generate a predictive yield map.

In another example, the information map 258 may be a weed intensity map generated during a prior operation, such as from a sprayer, and the variable sensed by the in-situ sensors 208 may be weed intensity. The predictive map 264 may then be a predictive weed intensity map that maps predicted weed intensity values to different geographic locations in the field. In such an example, a map of the weed intensities at time of spraying is geo-referenced recorded and provided to agricultural harvester 100 as an information map 258 of weed intensity. In-situ sensors 208 can detect weed intensity at geographic locations in the field and predictive model generator 210 may then build a predictive model that models a relationship between weed intensity at time of harvest and weed intensity at time of spraying. This is because the sprayer will have impacted the weed intensity at time of spraying, but weeds may still crop up in similar areas again by harvest. However, the weed areas at harvest are likely to have different intensity based on timing of the harvest, weather, weed type, among other things.

In some examples, predictive map 264 can be provided to the control zone generator 213. Control zone generator 213 groups adjacent portions of an area into one or more control zones based on data values of predictive map 264 that are associated with those adjacent portions. A control zone may include two or more contiguous portions of an area, such as a field, for which a control parameter corresponding to the control zone for controlling a controllable subsystem is constant. For example, a response time to alter a setting of controllable subsystems 216 may be inadequate to satisfactorily respond to changes in values contained in a map, such as predictive map 264. In that case, control zone generator 213 parses the map and identifies control zones that are of a defined size to accommodate the response time of the controllable subsystems 216. In another example, control zones may be sized to reduce wear from excessive actuator movement resulting from continuous adjustment. In some examples, there may be a different set of control zones for each controllable subsystem 216 or for groups of controllable subsystems 216. The control zones may be added to the predictive map 264 to obtain predictive control zone map 265. Predictive control zone map 265 can thus be similar to predictive map 264 except that predictive control zone map 265 includes control zone information defining the control zones. Thus, a functional predictive map 263, as described herein, may or may not include control zones. Both predictive map 264 and predictive control zone map 265 are functional predictive maps 263. In one example, a functional predictive map 263 does not include control zones, such as predictive map 264. In another example, a functional predictive map 263 does include control zones, such as predictive control zone map 265. In some examples, multiple crops may be simultaneously present in a field if an intercrop production system is implemented. In that case, predictive map generator 212 and control zone generator 213 are able to identify the location and characteristics of the two or more crops and then generate predictive map 264 and predictive control zone map 265 accordingly.

It will also be appreciated that control zone generator 213 can cluster values to generate control zones and the control zones can be added to predictive control zone map 265, or a separate map, showing only the control zones that are generated. In some examples, the control zones may be used for controlling or calibrating agricultural harvester 100 or both. In other examples, the control zones may be presented to the operator 260 and used to control or calibrate agricultural harvester 100, and, in other examples, the control zones may be presented to the operator 260 or another user or stored for later use.

Predictive map 264 or predictive control zone map 265 or both are provided to control system 214, which generates control signals based upon the predictive map 264 or predictive control zone map 265 or both. In some examples, communication system controller 229 controls communication system 206 to communicate the predictive map 264 or predictive control zone map 265 or control signals based on the predictive map 264 or predictive control zone map 265 to other agricultural harvesters that are harvesting in the same field. In some examples, communication system controller 229 controls the communication system 206 to send the predictive map 264, predictive control zone map 265, or both to other remote systems.

Operator interface controller 231 is operable to generate control signals to control operator interface mechanisms 218. The operator interface controller 231 is also operable to present the predictive map 264 or predictive control zone map 265 or other information derived from or based on the predictive map 264, predictive control zone map 265, or both to operator 260. Operator 260 may be a local operator or a remote operator. As an example, controller 231 generates control signals to control a display mechanism to display one or both of predictive map 264 and predictive control zone map 265 for the operator 260. Controller 231 may generate operator actuatable mechanisms that are displayed and can be actuated by the operator to interact with the displayed map. The operator can edit the map by, for example, correcting a weed type displayed on the map, based on the operator's observation. Settings controller 232 can generate control signals to control various settings on the agricultural harvester 100 based upon predictive map 264, the predictive control zone map 265, or both. For instance, settings controller 232 can generate control signals to control machine and header actuators 248. In response to the generated control signals, the machine and header actuators 248 operate to control, for example, one or more of the sieve and chaffer settings, concave clearance, rotor settings, cleaning fan speed settings, header height, header functionality, reel speed, reel position, draper functionality (where agricultural harvester 100 is coupled to a draper header), corn header functionality, internal distribution control and other actuators 248 that affect the other functions of the agricultural harvester 100. Path planning controller 234 illustratively generates control signals to control steering subsystem 252 to steer agricultural harvester 100 according to a desired path. Path planning controller 234 can control a path planning system to generate a route for agricultural harvester 100 and can control propulsion subsystem 250 and steering subsystem 252 to steer agricultural harvester 100 along that route. Feed rate controller 236 may receive a variety of different inputs indicative of a feed rate of material through agricultural harvester 100 and can control various subsystems, such as propulsion subsystem 250 and machine actuators 248, to control the feed rate based upon the predictive map 264 or predictive control zone map 265 or both. For instance, as agricultural harvester 100 approaches a weed patch having an intensity value above a selected threshold, feed rate controller 236 may generate a control signal to control propulsion subsystem 252 to reduce the speed of agricultural harvester 100 to maintain constant feed rate of biomass through the agricultural harvester 100. Header and reel controller 238 can generate control signals to control a header or a reel or other header functionality. Draper belt controller 240 can generate control signals to control a draper belt or other draper functionality based upon the predictive map 264, predictive control zone map 265, or both. Deck plate position controller 242 can generate control signals to control a position of a deck plate included on a header based on predictive map 264 or predictive control zone map 265 or both, and residue system controller 244 can generate control signals to control a residue subsystem 138 based upon predictive map 264 or predictive control zone map 265, or both. Machine cleaning controller 245 can generate control signals to control machine cleaning subsystem 254. For instance, based upon the different types of seeds or weeds passed through agricultural harvester 100, a particular type of machine cleaning operation or a frequency with which a cleaning operation is performed may be controlled. Other controllers included on the agricultural harvester 100 can control other subsystems based on the predictive map 264 or predictive control zone map 265 or both as well.

FIGS. 3A and 3B (collectively referred to herein as FIG. 3) show a flow diagram illustrating one example of the operation of agricultural harvester 100 in generating a predictive map 264 and predictive control zone map 265 based upon information map 258.

At 280, agricultural harvester 100 receives information map 258. Examples of information map 258 or receiving information map 258 are discussed with respect to blocks 281, 282, 284 and 286. As discussed above, information map 258 maps values of a variable, corresponding to a first characteristic, to different locations in the field, as indicated at block 282. As indicated at block 281, receiving the information map 258 may involve selecting one or more of a plurality of possible information maps that are available. For instance, one information map may be a vegetative index map generated from aerial imagery. Another information map may be a map generated during a prior pass through the field which may have been performed by a different machine performing a previous operation in the field, such as a sprayer or a planting machine or seeding machine or unmanned aerial vehicle (UAV) or other machine. The process by which one or more information maps are selected can be manual, semi-automated, or automated. The information map 258 is based on data collected prior to a current harvesting operation. This is indicated by block 284. For instance, the data may be collected based on aerial images taken during a previous year, or earlier in the current growing season, or at other times. The data may be based on data detected in ways other than using aerial images. For instance, agricultural harvester 100 may be fitted with a sensor, such as an internal optical sensor, that identifies weed seeds or other types of material exiting agricultural harvester 100. The weed seed or other data detected by the sensor during a previous year's harvest may be used as data used to generate the information map 258. The sensed weed data or other data may be combined with other data to generate the information map 258. For example, based upon a magnitude of the weed seeds exiting agricultural harvester 100 at different locations and based upon other factors, such as whether the seeds are being spread by a spreader or dropped in a windrow; the weather conditions, such as wind, when the seeds are being dropped or spread; drainage conditions which may move seeds around in the field; or other information, the location of those weed seeds can be predicted so that the information map 258 maps the predicted seed locations in the field. The data for the information map 258 can be transmitted to agricultural harvester 100 using communication system and stored in data store 202. The data for the information map 258 can be provided to agricultural harvester 100 using communication system 206 in other ways as well, and this is indicated by block 286 in the flow diagram of FIG. 3. In some examples, the information map 258 can be received by communication system 206.

Upon commencement of a harvesting operation, in-situ sensors 208 generate sensor signals indicative of one or more in-situ data values indicative of a characteristic, such as a speed characteristic, as indicated by block 288. Examples of in-situ sensors 288 are discussed with respect to blocks 222, 290, and 226. As explained above, the in-situ sensors 208 include on-board sensors 222; remote in-situ sensors 224, such as UAV-based sensors flown at a time to gather in-situ data, shown in block 290; or other types of in-situ sensors, designated by in-situ sensors 226. In some examples, data from on-board sensors is georeferenced using position, heading, or speed data from geographic position sensor 204.

Predictive model generator 210 controls the information variable-to-in-situ variable model generator 228 to generate a model that models a relationship between the mapped values contained in the information map 258 and the in-situ values sensed by the in-situ sensors 208 as indicated by block 292. The characteristics or data types represented by the mapped values in the information map 258 and the in-situ values sensed by the in-situ sensors 208 may be the same characteristics or data type or different characteristics or data types.

The relationship or model generated by predictive model generator 210 is provided to predictive map generator 212. Predictive map generator 212 generates a predictive map 264 that predicts a value of the characteristic sensed by the in-situ sensors 208 at different geographic locations in a field being harvested, or a different characteristic that is related to the characteristic sensed by the in-situ sensors 208, using the predictive model and the information map 258, as indicated by block 294.

It should be noted that, in some examples, the information map 258 may include two or more different maps or two or more different map layers of a single map. Each map layer may represent a different data type from the data type of another map layer or the map layers may have the same data type that were obtained at different times. Each map in the two or more different maps or each layer in the two or more different map layers of a map maps a different type of variable to the geographic locations in the field. In such an example, predictive model generator 210 generates a predictive model that models the relationship between the in-situ data and each of the different variables mapped by the two or more different maps or the two or more different map layers. Similarly, the in-situ sensors 208 can include two or more sensors each sensing a different type of variable. Thus, the predictive model generator 210 generates a predictive model that models the relationships between each type of variable mapped by the information map 258 and each type of variable sensed by the in-situ sensors 208. Predictive map generator 212 can generate a functional predictive map 263 that predicts a value for each sensed characteristic sensed by the in-situ sensors 208 (or a characteristic related to the sensed characteristic) at different locations in the field being harvested using the predictive model and each of the maps or map layers in the information map 258.

Predictive map generator 212 configures the predictive map 264 so that the predictive map 264 is actionable (or consumable) by control system 214. Predictive map generator 212 can provide the predictive map 264 to the control system 214 or to control zone generator 213 or both. Some examples of different ways in which the predictive map 264 can be configured or output are described with respect to blocks 296, 295, 299 and 297. For instance, predictive map generator 212 configures predictive map 264 so that predictive map 264 includes values that can be read by control system 214 and used as the basis for generating control signals for one or more of the different controllable subsystems of the agricultural harvester 100, as indicated by block 296.

Control zone generator 213 can divide the predictive map 264 into control zones based on the values on the predictive map 264. Contiguously-geolocated values that are within a threshold value of one another can be grouped into a control zone. The threshold value can be a default threshold value, or the threshold value can be set based on an operator input, based on an input from an automated system, or based on other criteria. A size of the zones may be based on a responsiveness of the control system 214, the controllable subsystems 216, based on wear considerations, or on other criteria as indicated by block 295. Predictive map generator 212 configures predictive map 264 for presentation to an operator or other user. Control zone generator 213 can configure predictive control zone map 265 for presentation to an operator or other user. This is indicated by block 299. When presented to an operator or other user, the presentation of the predictive map 264 or predictive control zone map 265 or both may contain one or more of the predictive values on the predictive map 264 correlated to geographic location, the control zones on predictive control zone map 265 correlated to geographic location, and settings values or control parameters that are used based on the predicted values on map 264 or zones on predictive control zone map 265. The presentation can, in another example, include more abstracted information or more detailed information. The presentation can also include a confidence level that indicates an accuracy with which the predictive values on predictive map 264 or the zones on predictive control zone map 265 conform to measured values that may be measured by sensors on agricultural harvester 100 as agricultural harvester 100 moves through the field. Further where information is presented to more than one location, an authentication and authorization system can be provided to implement authentication and authorization processes. For instance, there may be a hierarchy of individuals that are authorized to view and change maps and other presented information. By way of example, an on-board display device may show the maps in near real time locally on the machine, or the maps may also be generated at one or more remote locations, or both. In some examples, each physical display device at each location may be associated with a person or a user permission level. The user permission level may be used to determine which display markers are visible on the physical display device and which values the corresponding person may change. As an example, a local operator of machine 100 may be unable to see the information corresponding to the predictive map 264 or make any changes to machine operation. A supervisor, such as a supervisor at a remote location, however, may be able to see the predictive map 264 on the display but be prevented from making any changes. A manager, who may be at a separate remote location, may be able to see all of the elements on predictive map 264 and also be able to change the predictive map 264. In some instances, the predictive map 264 accessible and changeable by a manager located remotely may be used in machine control. This is one example of an authorization hierarchy that may be implemented. The predictive map 264 or predictive control zone map 265 or both can be configured in other ways as well, as indicated by block 297.

At block 298, input from geographic position sensor 204 and other in-situ sensors 208 are received by the control system. Particularly, at block 300, control system 214 detects an input from the geographic position sensor 204 identifying a geographic location of agricultural harvester 100. Block 302 represents receipt by the control system 214 of sensor inputs indicative of trajectory or heading of agricultural harvester 100, and block 304 represents receipt by the control system 214 of a speed of agricultural harvester 100. Block 306 represents receipt by the control system 214 of other information from various in-situ sensors 208.

At block 308, control system 214 generates control signals to control the controllable subsystems 216 based on the predictive map 264 or predictive control zone map 265 or both and the input from the geographic position sensor 204 and any other in-situ sensors 208. At block 310, control system 214 applies the control signals to the controllable subsystems. It will be appreciated that the particular control signals that are generated, and the particular controllable subsystems 216 that are controlled, may vary based upon one or more different things. For example, the control signals that are generated and the controllable subsystems 216 that are controlled may be based on the type of predictive map 264 or predictive control zone map 265 or both that is being used. Similarly, the control signals that are generated and the controllable subsystems 216 that are controlled and the timing of the control signals can be based on various latencies of crop flow through the agricultural harvester 100 and the responsiveness of the controllable subsystems 216.

By way of example, a generated predictive map 264 in the form of a predictive speed map can be used to control one or more subsystems 216. For instance, the predictive speed map can include speed values georeferenced to locations within the field being harvested. The speed values from the predictive speed map can be extracted and used to control the propulsion subsystem 250. By controlling the propulsion subsystem 250, a feed rate of material moving through the agricultural harvester 100 can be controlled. Similarly, the header height can be controlled to take in more or less material, and, thus, the header height can also be controlled to control feed rate of material through the agricultural harvester 100. In other examples, if the predictive map 264 maps weed height relative to positions in the field, control of the header height can be implemented. For example, if the values present in the predictive weed map indicate one or more areas having weed height with a first height amount, then header and reel controller 238 can control the header height so that the header is positioned above the first height amount of the weeds within the one or more areas having weeds at the first height amount when performing the harvesting operation. Thus, the header and reel controller 238 can be controlled using georeferenced values present in the predictive weed map to position the header to a height that is above the predicted height values of weeds obtained from the predictive weed map. Further, the header height can be changed automatically by the header and reel controller 238 as the agricultural harvester 100 proceeds through the field using georeferenced values obtained from the predictive weed map. The preceding example involving weed height and intensity using a predictive weed map is provided merely as an example. Consequently, a wide variety of other control signals can be generated using values obtained from a predictive weed map or other type of predictive map to control one or more of the controllable subsystems 216.

At block 312, a determination is made as to whether the harvesting operation has been completed. If harvesting is not completed, the processing advances to block 314 where in-situ sensor data from geographic position sensor 204 and in-situ sensors 208 (and perhaps other sensors) continue to be read.

In some examples, at block 316, agricultural harvester 100 can also detect learning trigger criteria to perform machine learning on one or more of the predictive map 264, predictive control zone map 265, the model generated by predictive model generator 210, the zones generated by control zone generator 213, one or more control algorithms implemented by the controllers in the control system 214, and other triggered learning.

The learning trigger criteria can include any of a wide variety of different criteria. Some examples of detecting trigger criteria are discussed with respect to blocks 318, 320, 321, 322 and 324. For instance, in some examples, triggered learning can involve recreation of a relationship used to generate a predictive model when a threshold amount of in-situ sensor data are obtained from in-situ sensors 208. In such examples, receipt of an amount of in-situ sensor data from the in-situ sensors 208 that exceeds a threshold trigger or causes the predictive model generator 210 to generate a new predictive model that is used by predictive map generator 212. Thus, as agricultural harvester 100 continues a harvesting operation, receipt of the threshold amount of in-situ sensor data from the in-situ sensors 208 triggers the creation of a new relationship represented by a predictive model generated by predictive model generator 210. Further, new predictive map 264, predictive control zone map 265, or both can be regenerated using the new predictive model. Block 318 represents detecting a threshold amount of in-situ sensor data used to trigger creation of a new predictive model.

In other examples, the learning trigger criteria may be based on how much the in-situ sensor data from the in-situ sensors 208 are changing, such as over time or compared to previous values. For example, if variations within the in-situ sensor data (or the relationship between the in-situ sensor data and the information in information map 258) are within a selected range or is less than a defined amount, or below a threshold value, then a new predictive model is not generated by the predictive model generator 210. As a result, the predictive map generator 212 does not generate a new predictive map 264, predictive control zone map 265, or both. However, if variations within the in-situ sensor data are outside of the selected range, are greater than the defined amount, or are above the threshold value, for example, then the predictive model generator 210 generates a new predictive model using all or a portion of the newly received in-situ sensor data that the predictive map generator 212 uses to generate a new predictive map 264. At block 320, variations in the in-situ sensor data, such as a magnitude of an amount by which the data exceeds the selected range or a magnitude of the variation of the relationship between the in-situ sensor data and the information in the information map 258, can be used as a trigger to cause generation of a new predictive model and predictive map. Keeping with the examples described above, the threshold, the range, and the defined amount can be set to default values; set by an operator or user interaction through a user interface; set by an automated system; or set in other ways.

Other learning trigger criteria can also be used. For instance, if predictive model generator 210 switches to a different information map (different from the originally selected information map 258), then switching to the different information map may trigger re-learning by predictive model generator 210, predictive map generator 212, control zone generator 213, control system 214, or other items. In another example, transitioning of agricultural harvester 100 to a different topography or to a different control zone may be used as learning trigger criteria as well.

In some instances, operator 260 can also edit the predictive map 264 or predictive control zone map 265 or both. The edits can change a value on the predictive map 264, change a size, shape, position, or existence of a control zone on predictive control zone map 265, or both. Block 321 shows that edited information can be used as learning trigger criteria.

In some instances, it may also be that operator 260 observes that automated control of a controllable subsystem, is not what the operator desires. In such instances, the operator 260 may provide a manual adjustment to the controllable subsystem reflecting that the operator 260 desires the controllable subsystem to operate in a different way than is being commanded by control system 214. Thus, manual alteration of a setting by the operator 260 can cause one or more of predictive model generator 210 to relearn a model, predictive map generator 212 to regenerate map 264, control zone generator 213 to regenerate one or more control zones on predictive control zone map 265, and control system 214 to relearn a control algorithm or to perform machine learning on one or more of the controller components 232 through 246 in control system 214 based upon the adjustment by the operator 260, as shown in block 322. Block 324 represents the use of other triggered learning criteria.

In other examples, relearning may be performed periodically or intermittently based, for example, upon a selected time interval such as a discrete time interval or a variable time interval, as indicated by block 326.

If relearning is triggered, whether based upon learning trigger criteria or based upon passage of a time interval, as indicated by block 326, then one or more of the predictive model generator 210, predictive map generator 212, control zone generator 213, and control system 214 performs machine learning to generate a new predictive model, a new predictive map, a new control zone, and a new control algorithm, respectively, based upon the learning trigger criteria. The new predictive model, the new predictive map, and the new control algorithm are generated using any additional data that has been collected since the last learning operation was performed. Performing relearning is indicated by block 328.

If the harvesting operation has been completed, operation moves from block 312 to block 330 where one or more of the predictive map 264, predictive control zone map 265, and predictive model generated by predictive model generator 210 are stored. The predictive map 264, predictive control zone map 265, and predictive model may be stored locally on data store 202 or sent to a remote system using communication system 206 for later use.

It will be noted that while some examples herein describe predictive model generator 210 and predictive map generator 212 receiving an information map in generating a predictive model and a functional predictive map, respectively, in other examples, the predictive model generator 210 and predictive map generator 212 can receive, in generating a predictive model and a functional predictive map, respectively other types of maps, including predictive maps, such as a functional predictive map generated during the harvesting operation.

FIG. 4 is a block diagram of a portion of the agricultural harvester 100 shown in FIG. 1. Particularly, FIG. 4 shows, among other things, examples of the predictive model generator 210 and the predictive map generator 212 in more detail. FIG. 4 also illustrates information flow among the various components shown. The predictive model generator 210 receives information map 258, which may be a vegetative index map 332, a predictive yield map 333, a biomass map 335, a crop state map 337, a topographic map 339, a soil property map 341, a seeding map 343 or another map 353, as an information map. Predictive model generator 210 also receives a geographic location 334, or an indication of a geographic location, from geographic position sensor 204. In-situ sensors 208 illustratively include machine speed sensor 146, or a sensor 336 that senses an output from feed rate controller 236, as well as a processing system 338. The processing system 338 processes sensor data generated from machine speed sensor 146 or from sensor 336, or both, to generate processed data, some examples of which are described below.

In some examples, sensor 336 may be a sensor, that generates a signal indicative of the control outputs from feed rate controller 236. The control signals may be speed control signals or other control signals that are applied to controllable subsystems 216 to control feed rate of material through agricultural harvester 100. Processing system 338 processes the signals obtained via the sensor 336 to generate processed data 340 identifying the speed of agricultural harvester 100.

In some examples, raw or processed data from in-situ sensor(s) 208 may be presented to operator 260 via operator interface mechanism 218. Operator 260 may be onboard the agricultural harvester 100 or at a remote location.

The present discussion proceeds with respect to an example in which in-situ sensor 208 is machine speed sensor 146. It will be appreciated that this is just one example, and the sensors mentioned above, as other examples of in-situ sensor 208 from which machine speed can be derived, are contemplated herein as well. As shown in FIG. 4, the example predictive model generator 210 includes one or more of a vegetative index (VI) value-to-speed model generator 342, a biomass-to-speed model generator 344, topography-to-speed model generator 345, yield-to-speed model generator 347, crop state-to-speed model generator 349, soil property-to-speed model generator 351 and a seeding characteristic-to-speed model generator 346. In other examples, the predictive model generator 210 may include additional, fewer, or different components than those shown in the example of FIG. 4. Consequently, in some examples, the predictive model generator 210 may include other items 348 as well, which may include other types of predictive model generators to generate other types of models.

Model generator 342 identifies a relationship between machine speed detected in processed data 340, at a geographic location corresponding to where the processed data 340 were obtained, and a vegetative index value from the vegetative index map 332 corresponding to the same location in the field where the speed characteristic was detected. Based on this relationship established by model generator 342, model generator 342 generates a predictive speed model. The predictive speed model is used by speed map generator 352 to predict target machine speeds at different locations in the field based upon the georeferenced vegetative index value contained in the vegetative index map 332 at the same locations in the field.

Model generator 344 identifies a relationship between machine speed represented in the processed data 340, at a geographic location corresponding to the processed data 340, and the biomass value at the same geographic location. Again, the biomass value is the georeferenced value contained in the biomass map 335. Model generator 344 then generates a predictive speed model that is used by speed map generator 352 to predict the target machine speed at a location in the field based upon the biomass value for that location in the field.

Model generator 345 identifies a relationship between machine speed identified by processed data 340 at a particular location on the field and the topographic speed model that is used by speed map generator 352 to predict expected machine speed at a particular location in the field based on the topographic characteristic value at that location in the field.

Model generator 346 identifies a relationship between the machine speed identified by processed data 340 at a particular location in the field and the seeding characteristic value from the seeding characteristic map 343 at that same location. Model generator 346 generates a predictive speed model that is used by speed map generator 352 to predict the expected machine speed at a particular location in the field based upon the seeding characteristic value at that location in the field.

Model generator 347 identified a relationship between the machine speed identified by processed data 340 at a particular location on the field and the yield characteristic value from predictive yield map 333 at that same location model generator 347 generates a predictive speed model that is used by speed map generator 352 to predict the expected machine speed at a particular location on the field based upon the yield characteristic value at that location in the field.

Model generator 349 identifies a relationship between the machine speed identified by processed data 340 at a particular location in the field and the crop state characteristic value from crop state map 337 at the same location. Model generator 349 generates a predictive speed model that is used by speed map generator 352 to predict the expected machine speed at a particular location in the field based on the crop state characteristic value at that location in the field.

Model generator 351 identifies a relationship between the machine speed identified by processed data 340 at a particular location in the field and the soil property characteristic value from soil property map 341 at the same location. Model generator 351 generates a predictive speed model that is used by speed map generator 352 to predict the expected machine speed at a particular location in the field based on the soil property characteristic value at that location in the field.

In light of the above, the predictive model generator 210 is operable to produce a plurality of predictive speed models, such as one or more of the predictive speed models generated by model generators 342, 344, 345, 346, 347, 349 and 351. In another example, two or more of the predictive speed models described above may be combined into a single predictive speed model that predicts expected machine speed based on two or more of the vegetative index value, the biomass value, the topography, the yield, the seeding characteristic, the crop state, or the soil property, at different locations in the field. Any of these speed models, or combinations thereof, are represented collectively by predictive model 350 in FIG. 4.

The predictive model 350 is provided to predictive map generator 212. In the example of FIG. 4, predictive map generator 212 includes a speed map generator 352. In other examples, the predictive map generator 212 may include additional, fewer, or different map generators. Thus, in some examples, the predictive map generator 212 may include other items 358 which may include other types of map generators to generate speed maps. Speed map generator 352 receives the predictive model 350, which predicts target machine speed based upon a value from one or more information maps 258, along with the one or more information maps 258, and generates a predictive map that predicts the target machine speed at different locations in the field.

Predictive map generator 212 outputs one or more functional predictive speed maps 360 that are predictive of expected machine speed. The functional predictive speed map 360 predicts the expected machine speed at different locations in a field. The functional predictive speed maps 360 may be provided to control zone generator 213, control system 214, or both. Control zone generator 213 generates control zones and incorporates those control zones into the functional predictive map, i.e., predictive map 360, to produce predictive control zone map 265. One or both of predictive map 264 and predictive control zone map 265 may be provided to control system 214, which generates control signals to control one or more of the controllable subsystems 216, such as propulsion subsystem 250 based upon the predictive map 264, predictive control zone map 265, or both.

FIG. 5 is a flow diagram of an example of operation of predictive model generator 210 and predictive map generator 212 in generating the predictive model 350 and the functional predictive speed map 360. At block 362, predictive model generator 210 and predictive map generator 212 receive an information map 258. The information map 258 may be any of the maps 332, 333, 335, 337, 339, 341 or 343. In addition, block 361 indicates that the received information map may be a single map. Block 363 indicates that the information map may be multiple maps or multiple map layers. Block 365 indicates that the information map 258 may take other forms as well. At block 364, processing system 338 receives one or more signals from machine speed sensor 146 or sensor 336 or both.

At block 372, processing system 338 processes the one or more received signals to generate processed data 340 indicative of a machine speed of agricultural harvester 100.

At block 382, predictive model generator 210 also obtains the geographic location 334 corresponding to the processed data. For instance, the predictive model generator 210 can obtain the geographic position from geographic position sensor 204 and determine, based upon machine delays, machine speed, etc., a precise geographic location where the processed data was taken or from which the processed data 340 was derived.

At block 384, predictive model generator 210 generates one or more predictive models, such as predictive model 350, that model a relationship between a value in the one or more information map 258, and a machine speed being sensed by the in-situ sensor 208. VI value-to-speed model generator 342 generates a predictive model that models a relationship between VI values in VI map 332 and machine speed sensed by in-situ sensor 208. Biomass-to-speed model generator 344 generates a predictive model that models a relationship between biomass values in biomass map 335 and machine speed sensed by in-situ sensor 208. Topography-to-speed model generator 345 generates a predictive model that models a relationship between one or more topography values such as pitch, roll, or slope in topographic map 339 and machine speed sensed by in-situ sensor 208. Seeding characteristic-to-speed model generator 346 generates a predictive model that models a relationship between seeding characteristics in seeding map 343 and machine speed sensed by in-situ sensor 208. Yield-to-speed model generator 347 generates a predictive model that models a relationship between yield values in yield map 333 and machine speed sensed by in-situ sensor 208. Crop state-to-speed model generator 342 generates a predictive model that models a relationship between crop state values in crop state map 337 and machine speed sensed by in-situ sensor 208. Soil property-to-speed model generator 351 generates a predictive model that models a relationship between soil property values in soil property map 341 and machine speed sensed by in-situ sensor 208. At block 386, the predictive model 350 is provided to predictive map generator 212 which generates a functional predictive speed map 360 that maps a predicted, target machine speed based on the information map 258 and the predictive speed model 350. Speed map generator 352 may generate the functional predictive speed map 360 using a predictive model 350 that models a relationship between VI values in VI map 332 and machine speed and using the VI map 332. Speed map generator 352 may generate the functional predictive speed map 360 using a predictive model 350 that models a relationship between yield values in yield map 333 and machine speed and using the yield map 333. Speed map generator 352 may generate the functional predictive speed map 360 using a predictive model 350 that models a relationship between biomass values in biomass map 335 and machine speed and using the biomass map 335. Speed map generator 352 may generate the functional predictive speed map 360 using a predictive model 350 that models a relationship between crop state values in crop state map 337 and machine speed and using the crop state map 337. Speed map generator 352 may generate the functional predictive speed map 360 using a predictive model 350 that models a relationship between topographic values in topographic map 339 and machine speed and using the topographic map 332. Speed map generator 352 may generate the functional predictive speed map 360 using a predictive model 350 that models a relationship between soil property values in soil property map 341 and machine speed and using the soil property map 341. Speed map generator 352 may generate the functional predictive speed map 360 using a predictive model 350 that models a relationship between seeding characteristic values in seeding map 343 and machine speed and using the seeding map 343. Speed map generator 352 may generate the functional predictive speed map 360 using another predictive model 350 that models a relationship between other characteristic values on other map 353 and machine speed and using the other map 353.

Thus, as an agricultural harvester is moving through a field performing an agricultural operation, one or more functional predictive speed maps 360 are generated as the agricultural operation is being performed.

At block 394, predictive map generator 212 outputs the functional predictive speed map 360. At block 391 functional predictive speed map generator 212 outputs the functional predictive speed map 360 for presentation to and possible interaction by operator 260. At block 393, predictive map generator 212 may configure the map 360 for consumption by control system 214. At block 395, predictive map generator 212 can also provide the map 360 to control zone generator 213 for generation of control zones. At block 397, predictive map generator 212 configures the map 360 in other ways as well. The functional predictive speed map 360 (with or without the control zones) is provided to control system 214. At block 396, control system 214 generates control signals to control the controllable subsystems 216 based upon the functional predictive speed map 360. The control system 214 may control propulsion subsystem 250 or other subsystems 399.

It can thus be seen that the present system takes an information map that maps an agricultural characteristic such as a vegetative index, crop state, seeding characteristic, soil properties, biomass, predicted yield, topography, or information from a prior operation pass or passes to different locations in a field. The present system also uses one or more in-situ sensors that sense in-situ sensor data that is indicative of a characteristic, indicative of machine speed, and generates a model that models a relationship between the characteristic sensed using the in-situ sensor, or a related characteristic, and the characteristic mapped in the information map. Thus, the present system generates a functional predictive map using a model, in-situ data, and an information map and may configure the generated functional predictive map for consumption by a control system, for presentation to a local or remote operator or other user, or both. For example, the control system may use the map to control one or more systems of a combine harvester.

The present discussion has mentioned processors and servers. In some examples, the processors and servers include computer processors with associated memory and timing circuitry, not separately shown. The processors and servers are functional parts of the systems or devices to which the processors and servers belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, the user actuatable operator interface mechanisms can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores may be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, components, logic, and interactions. It will be appreciated that any or all of such systems, components, logic and interactions may be implemented by hardware items, such as processors, memory, or other processing components, some of which are described below, that perform the functions associated with those systems, components, logic, or interactions. In addition, any or all of the systems, components, logic and interactions may be implemented by software that is loaded into a memory and is subsequently executed by a processor or server or other computing component, as described below. Any or all of the systems, components, logic and interactions may also be implemented by different combinations of hardware, software, firmware, etc., some examples of which are described below. These are some examples of different structures that may be used to implement any or all of the systems, components, logic and interactions described above. Other structures may be used as well.

Figure 6:
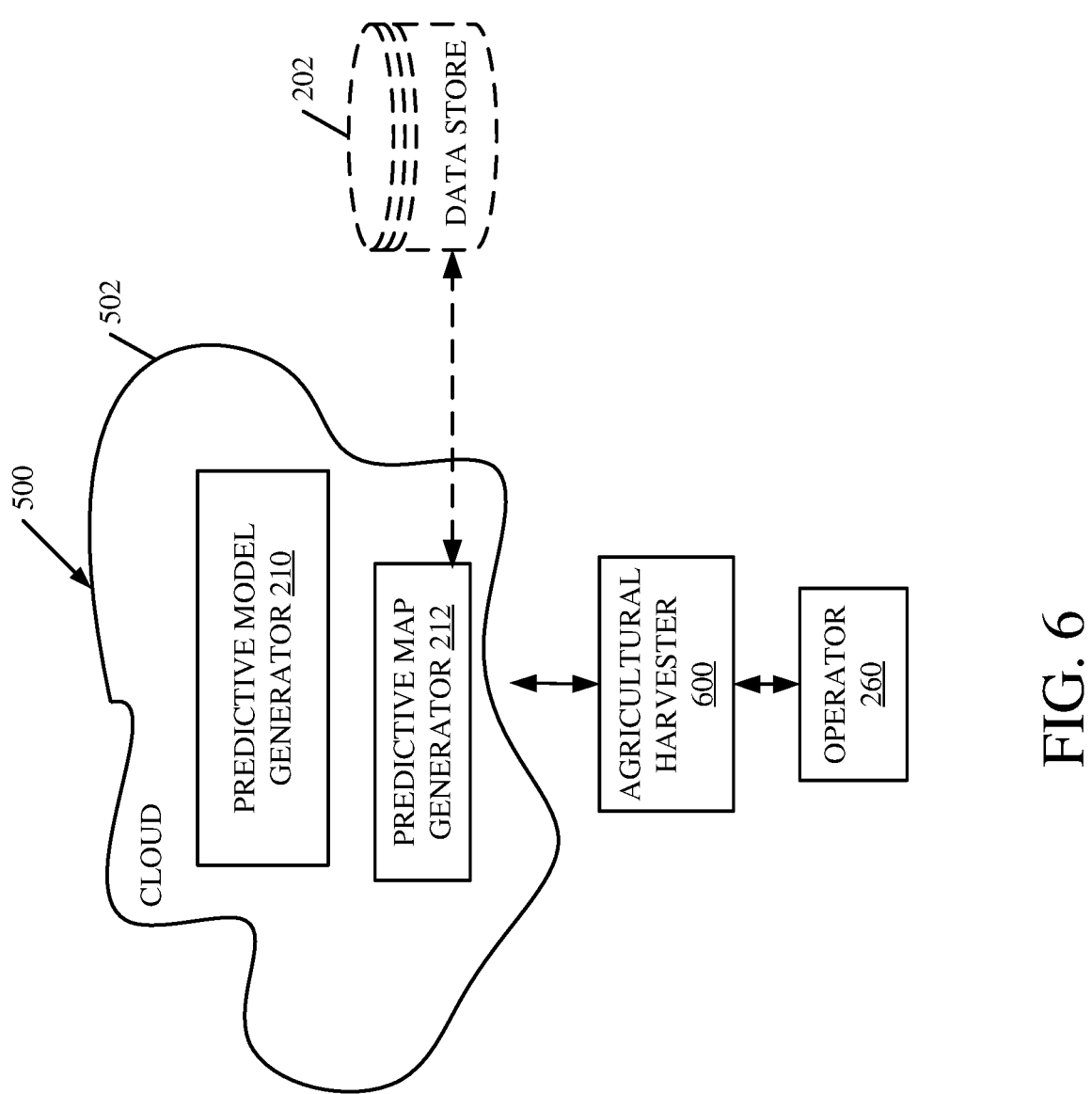
FIG. 6 is a block diagram showing one example of an agricultural harvester in communication with a remote server environment.

FIG. 6 is a block diagram of agricultural harvester 600, which may be similar to agricultural harvester 100 shown in FIG. 2. The agricultural harvester 600 communicates with elements in a remote server architecture 500. In some examples, remote server architecture 500 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in FIG. 2 as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 6, some items are similar to those shown in FIG. 2 and those items are similarly numbered. FIG. 6 specifically shows that predictive model generator 210 or predictive map generator 212, or both, may be located at a server location 502 that is remote from the agricultural harvester 600. Therefore, in the example shown in FIG. 6, agricultural harvester 600 accesses systems through remote server location 502.

FIG. 6 also depicts another example of a remote server architecture. FIG. 6 shows that some elements of FIG. 2 may be disposed at a remote server location 502 while others may be located elsewhere. By way of example, data store 202 may be disposed at a location separate from location 502 and accessed via the remote server at location 502. Regardless of where the elements are located, the elements can be accessed directly by agricultural harvester 600 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users, or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated, or manual information collection system. As the combine harvester 600 comes close to the machine containing the information collection system, such as a fuel truck prior to fueling, the information collection system collects the information from the combine harvester 600 using any type of ad-hoc wireless connection. The collected information may then be forwarded to another network when the machine containing the received information reaches a location where wireless telecommunication service coverage or other wireless coverage—is available. For instance, a fuel truck may enter an area having wireless communication coverage when traveling to a location to fuel other machines or when at a main fuel storage location. All of these architectures are contemplated herein. Further, the information may be stored on the agricultural harvester 600 until the agricultural harvester 600 enters an area having wireless communication coverage. The agricultural harvester 600, itself, may send the information to another network.

It will also be noted that the elements of FIG. 2, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 500 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 7:
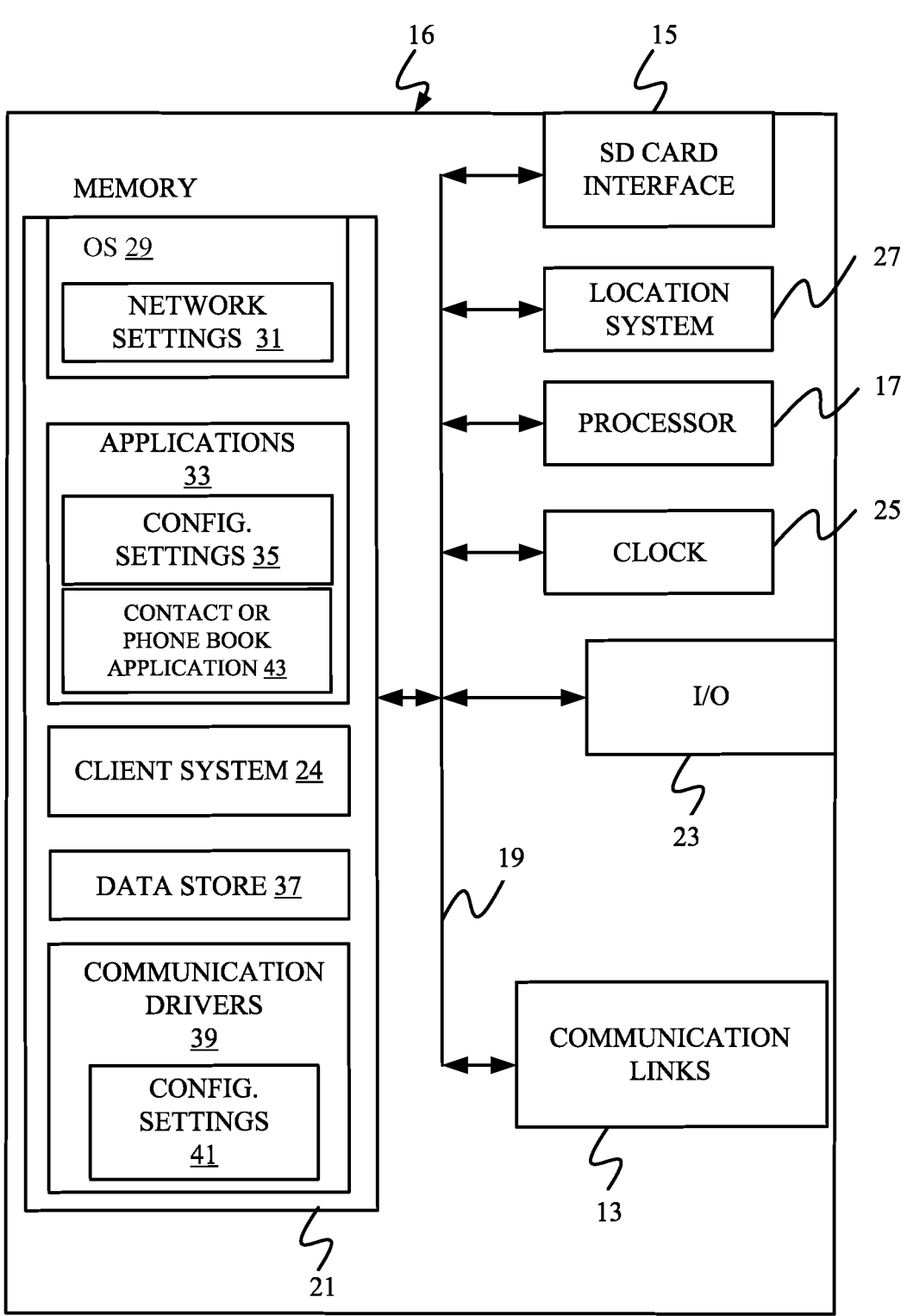
FIGS. 7-9 show examples of mobile devices that can be used in an agricultural harvester.
Figure 8:
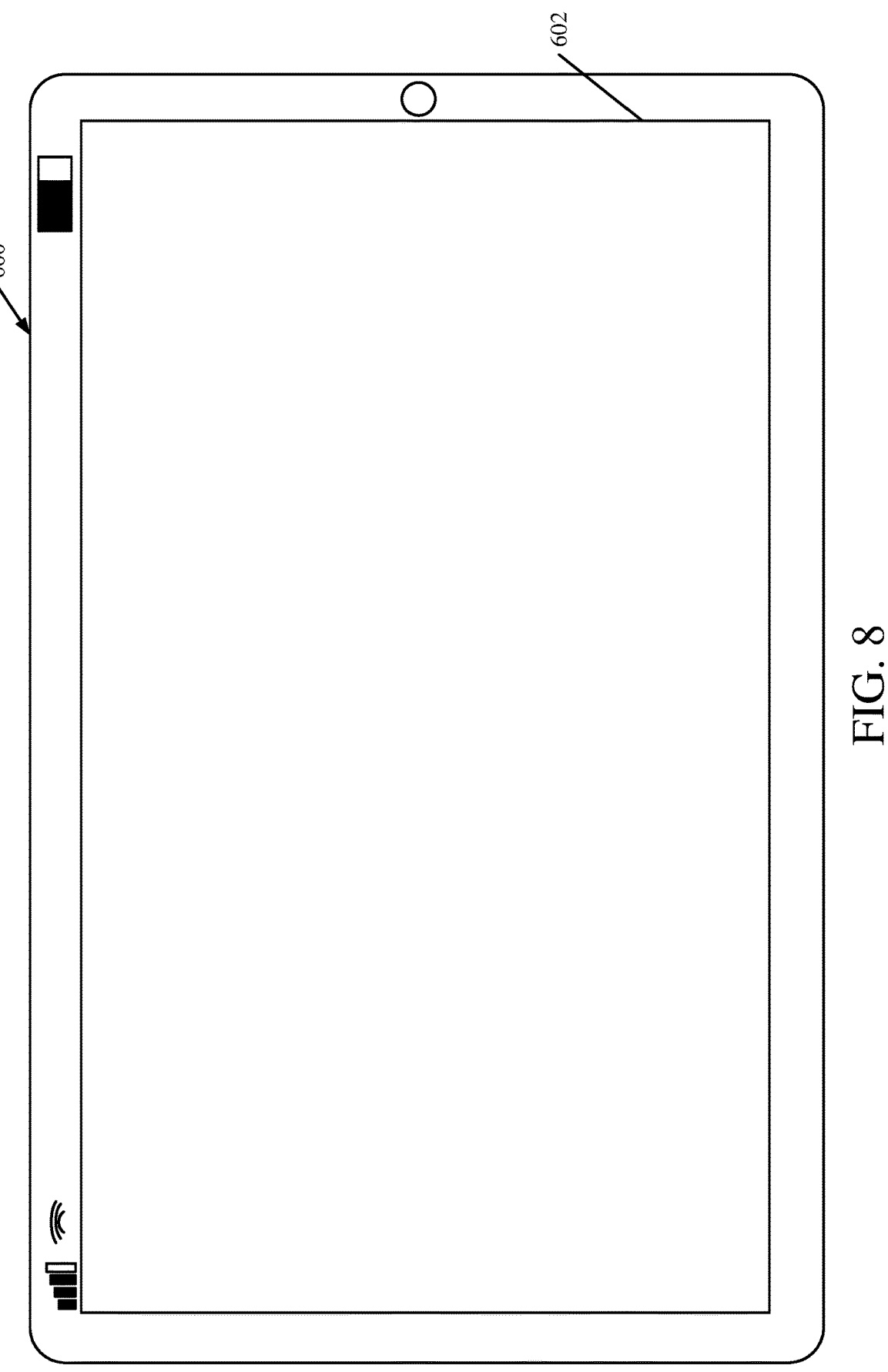
Figure 9:
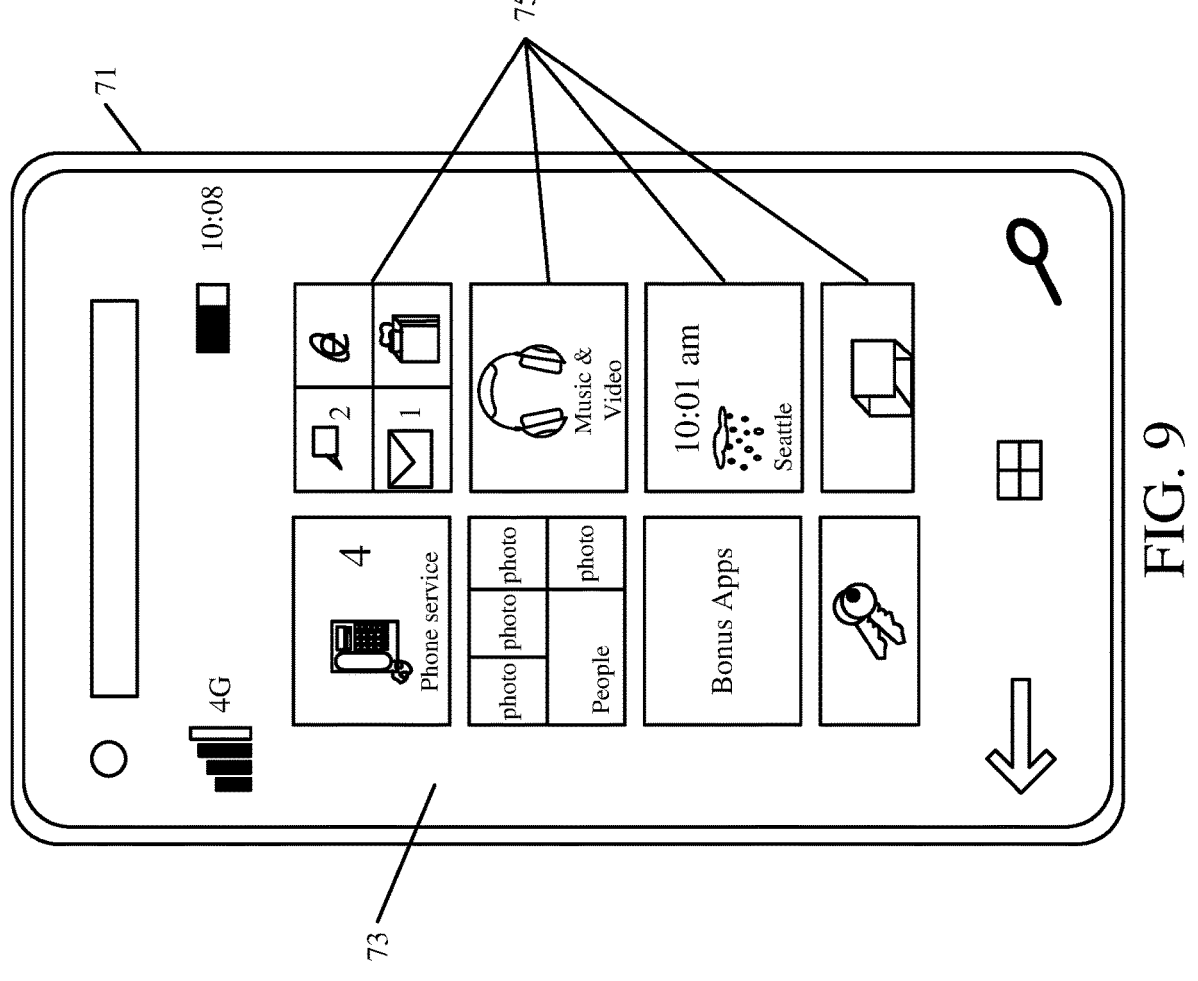

FIG. 7 is a simplified block diagram of one illustrative example of a handheld or mobile computing device that can be used as a user's or client's hand held device 16, in which the present system (or parts of it) can be deployed. For instance, a mobile device can be deployed in the operator compartment of agricultural harvester 100 for use in generating, processing, or displaying the maps discussed above. FIGS. 8-9 are examples of handheld or mobile devices.

FIG. 7 provides a general block diagram of the components of a client device 16 that can run some components shown in FIG. 2, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 8 shows one example in which device 16 is a tablet computer 600. In FIG. 8, computer 600 is shown with user interface display screen 602. Screen 602 can be a touch screen or a pen-enabled interface that receives inputs from a pen or stylus. Tablet computer 600 may also use an on-screen virtual keyboard. Of course, computer 600 might also be attached to a keyboard or other user input device through a suitable attachment mechanism, such as a wireless link or USB port, for instance. Computer 600 may also illustratively receive voice inputs as well.

FIG. 9 is similar to FIG. 8 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
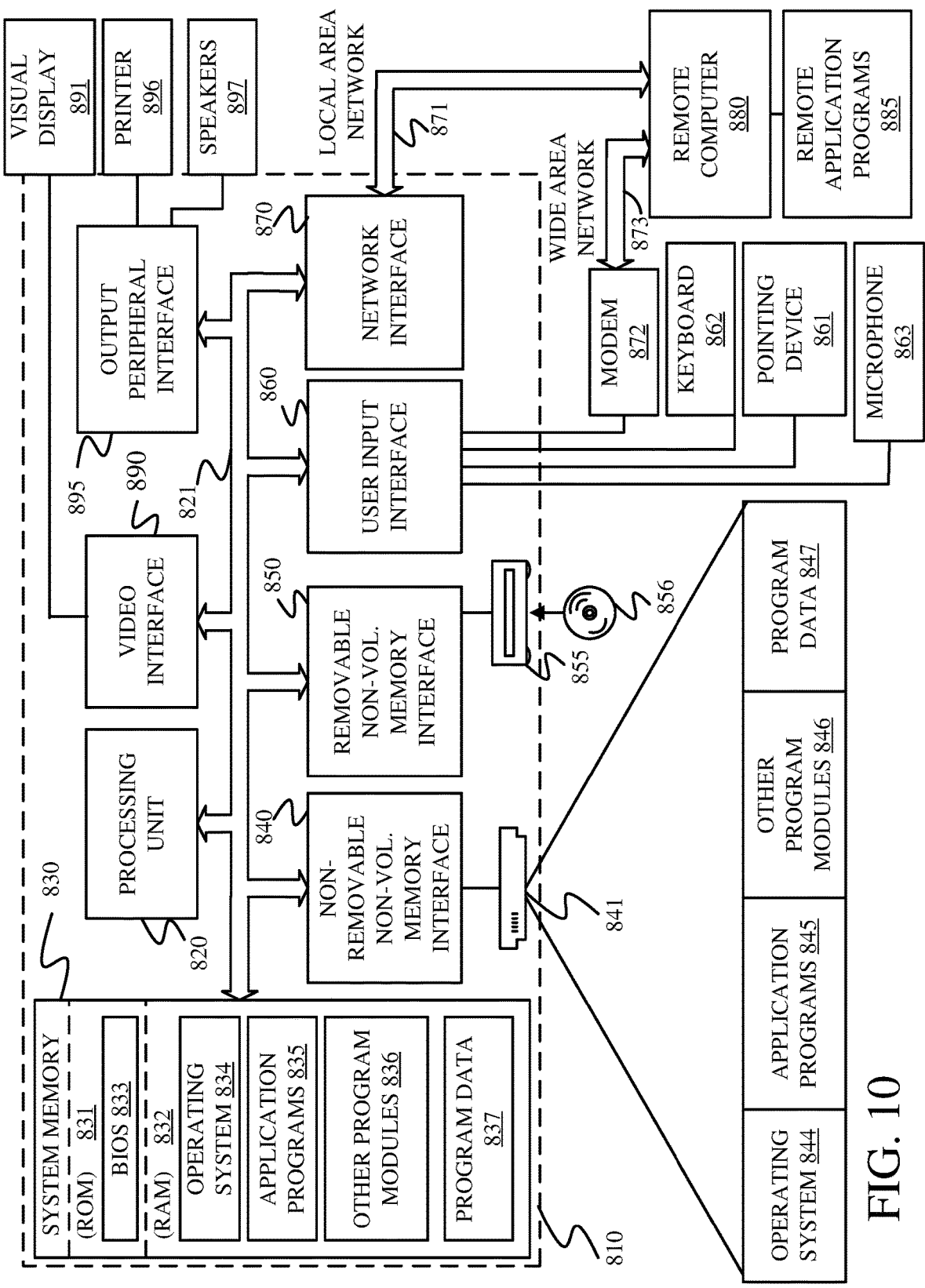
FIG. 10 is a block diagram showing one example of a computing environment that can be used in an agricultural harvester and the architectures illustrated in previous figures.

FIG. 10 is one example of a computing environment in which elements of FIG. 2 can be deployed. With reference to FIG. 10, an example system for implementing some embodiments includes a computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 10.

Computer 810 typically includes a variety of computer readable media. Computer readable media may be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory or both such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data or program modules or both that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 10 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is an agricultural work machine, comprising:

a communication system that receives an information map that includes values of a first agricultural characteristic corresponding to different geographic locations in a field;

a geographic position sensor that detects a geographic location of the agricultural work machine;

an in-situ sensor that detects a value of a second agricultural characteristic corresponding to the geographic location;

a predictive model generator that generates a predictive agricultural model that models a relationship between the first agricultural characteristic and the second agricultural characteristic based on a value of the first agricultural characteristic in the information map at the geographic location and the value of the second agricultural characteristic detected by the in-situ sensor at the geographic location; and a predictive map generator that generates a functional predictive machine speed map of the field, that maps predictive machine speed values indicative of predicted speed of the agricultural harvester at the different geographic locations in the field, based on the values of the first agricultural characteristic in the information map and based on the predictive agricultural model.

Example 2 is the agricultural work machine of any or all previous examples, wherein the predictive map generator configures the functional predictive machine speed map for consumption by a control system that generates control signals to control a subsystem on the agricultural work machine based on the predictive machine speed values on the functional predictive machine speed map.

Example 3 is the agricultural work machine of any or all previous examples, wherein the in-situ sensor on the agricultural work machine is configured to detect, as the value of the second agricultural characteristic, a value of a speed characteristic indicative of the speed of the agricultural harvester corresponding to the geographic location.

Example 4 is the agricultural work machine of any or all previous examples, further comprising a feed rate controller configured to generate a feed rate control signal to control a controllable subsystem of the agricultural harvester based on a target feed rate of material through the agricultural harvester and wherein the in-situ sensor comprises:

a sensor configured to generate a sensor signal indicative of an output of the feed rate controller; and a processing system that receives the sensor signal and generates processed data indicative of machine speed of the agricultural harvester based on the sensor signal.

Example 5 is the agricultural work machine of any or all previous examples, wherein the information map comprises a vegetative index map of vegetative index (VI) values corresponding to different geographic locations in a field, and wherein the predictive model generator comprises:

a VI-to-speed model generator that generates a predictive speed model that models a relationship between the VI values and the speed characteristic based on the VI value in the VI map at the geographic location and the value of the speed characteristic detected by the in-situ sensor at the geographic location.

Example 6 is the agricultural work machine of any or all previous examples, wherein the information map comprises a biomass map of biomass values corresponding to different geographic locations in a field, and wherein the predictive model generator comprises:

a biomass-to-speed model generator that generates a predictive speed model that models a relationship between the biomass values and the speed characteristic based on the biomass value in the biomass map at the geographic location and the value of the speed characteristic detected by the in-situ sensor at the geographic location.

Example 7 is the agricultural work machine of any or all previous examples, wherein the information map comprises a topographic map of topographic values corresponding to different geographic locations in a field, and wherein the predictive model generator comprises:

a topographic-to-speed model generator that generates a predictive speed model that models a relationship between the topographic values and the speed characteristic based on the topographic value in the topographic map at the geographic location and the value of the speed characteristic detected by the in-situ sensor at the geographic location.

Example 8 is the agricultural work machine of any or all previous examples, wherein the information map comprises a predictive yield map of predictive yield values corresponding to different geographic locations in a field, and wherein the predictive model generator comprises:

a yield-to-speed model generator that generates a predictive speed model that models a relationship between the predictive yield values and the speed characteristic based on the predictive yield value in the predictive yield map at the geographic location and the value of the speed characteristic detected by the in-situ sensor at the geographic location.

Example 9 is the agricultural work machine of any or all previous examples, wherein the information map comprises a soil properties map of soil property values corresponding to different geographic locations in a field, and wherein the predictive model generator comprises:

a soil property-to-speed model generator that generates a predictive speed model that models a relationship between the soil property values and the speed characteristic based on the soil property value in the soil property map at the geographic location and the value of the speed characteristic detected by the in-situ sensor at the geographic location.

Example 10 is the agricultural work machine of any or all previous examples, wherein the information map comprises a seeding characteristic map of seeding characteristic values corresponding to different geographic locations in a field, and wherein the predictive model generator comprises:

a seeding characteristic-to-speed model generator that generates a predictive speed model that models a relationship between the seeding characteristic values and the speed characteristic based on the seeding characteristic value in the seeding characteristic map at the geographic location and the value of the speed characteristic detected by the in-situ sensor at the geographic location.

Example 11 is the agricultural work machine of any or all previous examples, wherein the information map comprises a crop state map of crop state values corresponding to different geographic locations in a field, and wherein the predictive model generator comprises:

a crop state-to-speed model generator that generates a predictive speed model that models a relationship between the crop state values and the speed characteristic based on the crop state value in the crop state map at the geographic location and the value of the speed characteristic detected by the in-situ sensor at the geographic location.

Example 12 is a computer implemented method of generating a functional predictive agricultural map, comprising:

receiving an information map, at an agricultural work machine, that indicates values of a first agricultural characteristic corresponding to different geographic locations in a field;

detecting a geographic location of the agricultural work machine;

detecting, with an in-situ sensor, a value of a second agricultural characteristic corresponding to the geographic location;

generating a predictive agricultural model that models a relationship between the first agricultural characteristic and the second agricultural characteristic; and controlling a predictive map generator to generate a functional predictive machine speed map of the field, that maps predictive target machine speed values to the different locations in the field based on the values of the first agricultural characteristic in the information map and the predictive agricultural model.

Example 13 is the computer implemented method of any or all previous examples, and further comprising:

configuring the functional predictive machine speed map for a propulsion controller that generates control signals to control a controllable propulsion subsystem on the agricultural work machine based on the functional predictive machine speed map.

Example 14 is the computer implemented method of any or all previous examples, wherein detecting, with an in-situ sensor, a value of the second agricultural characteristic comprises detecting a speed characteristic corresponding to the geographic location, and wherein receiving the information map comprises receiving one or more of a vegetative index map, a biomass map, a crop state map, a soil property map, a predictive yield map, a topographic map and a seeding map.

Example 15 is the computer implemented method of any or all previous examples, wherein receiving the information map comprises:

receiving a plurality of different information map layers, each information map layer, of the plurality of different information map layers indicating one or more of vegetative index values, biomass values, predictive yield values, crop state values, soil property values, seeding characteristic values and topographic values at the geographic location.

Example 16 is the computer implemented method of any or all previous examples, wherein receiving an information map comprises:

receiving an information map generated from a prior operation performed in the field.

Example 17 is the computer implemented method of any or all previous examples, further comprising:

controlling an operator interface mechanism to present the functional predictive machine speed map.

Example 18 is an agricultural work machine, comprising:

a communication system that receives an information map that indicates values of a first agricultural characteristic corresponding to different geographic locations in a field;

a geographic position sensor that detects a geographic location of the agricultural work machine;

an in-situ sensor that detects a value of a speed characteristic, indicative of a speed of the agricultural work machine corresponding to the geographic location;

a predictive model generator that generates a predictive speed model that models a relationship between the first agricultural characteristic and the speed characteristic based on the value of the first agricultural characteristic in the information map at the geographic location and the value of the speed characteristic detected by the in-situ sensor at the geographic location; and a predictive map generator that generates a functional predictive speed map of the field, that maps predictive speed characteristic values, indicative of target machine speeds, to the different locations in the field, based on the values of the first agricultural characteristic in the information map and based on the predictive speed model.

Example 19 is the agricultural work machine of any or all previous examples, wherein the in-situ sensor comprises:

a machine speed sensor configured to detect the speed of the agricultural work machine.

Example 20 is the agricultural work machine of any or all previous examples wherein the predictive map generator is configured to configure the functional predictive speed map for consumption by a control system to control a propulsion subsystem based on the target machine speeds of the functional predictive speed map.

Although the subject matter has been described in language specific to structural features or methodological acts, it is to be understood that the subject matter defined in the appended claims is not necessarily limited to the specific features or acts described above. Rather, the specific features and acts described above are disclosed as example forms of the claims.

What is claimed is:

1. An agricultural system comprising:

a communication system that receives an information map that includes values of a first agricultural characteristic corresponding to a plurality of different geographic locations in a field;

a geographic position sensor that detects a geographic location of an agricultural work machine;

an in-situ sensor that detects a value of a second agricultural characteristic corresponding to a first geographic location, of the plurality of different geographic locations, in the field;

one or more processors; and a data store that stores computer executable instructions that, when executed by the one or more processors, configure the one or more processors to:

predict a respective predictive machine speed value corresponding to each geographic location, of a set of geographic locations of the plurality of different geographic locations in the field, based on a value of the first agricultural characteristic in the information map corresponding to the first geographic location in the field, based on the value of the second agricultural characteristic detected by the in-situ sensor corresponding to the first geographic location in the field, and based on a respective value of the first agricultural characteristic in the information map corresponding to each respective geographic location, of the set of geographic locations of the plurality of different geographic locations in the field, wherein each respective geographic location, of the set of geographic locations of the plurality of different geographic locations in the field, is different than the first geographic location in the field, and wherein each respective predictive machine speed value is indicative of a respective predictive travel speed of the agricultural work machine; and control a controllable subsystem on the agricultural work machine based on the respective predictive machine speed value corresponding to at least one geographic location of the set of geographic locations.

2. The agricultural system of claim 1, wherein the computer executable instructions, when executed by the one or more processors, further configure the one or more processors to:

identify a relationship between the first agricultural characteristic and the second agricultural characteristic based on the value of the first agricultural characteristic in the information map corresponding to the first geographic location and based on the value of the second agricultural characteristic detected by the in-situ sensor corresponding to the first geographic location; and predict the respective predictive machine speed value corresponding to each geographic location of the plurality of different geographic locations in the field based on the identified relationship and based on the value of the first agricultural characteristic in the information map corresponding to each geographic location, of the set of geographic locations of the plurality of different geographic locations in the field.

3. The agricultural system of claim 1, wherein the controllable subsystem comprises a propulsion subsystem on the agricultural work machine.

4. The agricultural system of claim 1, wherein the controllable subsystem comprises a draper belt on the agricultural work machine.

5. The agricultural system of claim 1, wherein the controllable subsystem comprises a reel on the agricultural work machine.

6. The agricultural system of claim 1, wherein the controllable subsystem comprises a header on the agricultural work machine.

7. The agricultural system of claim 1, wherein the controllable subsystem comprises a residue subsystem on the agricultural work machine.

8. The agricultural system of claim 1, wherein the controllable subsystem comprises a cleaning subsystem on the agricultural work machine.

9. The agricultural system of claim 1, wherein the information map comprises one of:

a vegetative index map that includes, as the values of the first agricultural characteristic, vegetative index (VI) values corresponding to the plurality of different geographic locations in the field;

a biomass map that includes, as the values of the first agricultural characteristic, biomass values corresponding to the plurality of different geographic locations in the field;

a topographic map that includes, as the values of the first agricultural characteristic, values of a topographic characteristic corresponding to the plurality of different geographic locations in the field;

a yield map that includes, as the values of the first agricultural characteristic, yield values corresponding to the plurality of different geographic locations in the field;

a soil property map that includes, as the values of the first agricultural characteristic, values of a soil property corresponding to the plurality of different geographic locations in the field;

a seeding characteristic map that includes, as the values of the first agricultural characteristic, values of a seeding characteristic corresponding to the plurality of different geographic locations in the field; or a crop state map that includes, as values of the first agricultural characteristic, crop state values corresponding to the plurality of different geographic locations in the field.

10. The agricultural system of claim 1, wherein the second agricultural characteristic comprises a speed characteristic indicative of a travel speed of the agricultural work machine, and the in-situ sensor on the agricultural work machine is configured to detect, as the value of the second agricultural characteristic, a value of the speed characteristic indicative of the travel speed of the agricultural work machine corresponding to the first geographic location in the field.

11. A computer implemented method of controlling an agricultural work machine, the computer implemented method comprising:

obtaining an information map that indicates values of a first agricultural characteristic corresponding to a plurality of different geographic locations in a field;

detecting a geographic location of the agricultural work machine;

detecting, with an in-situ sensor, a value of a second agricultural characteristic corresponding to a first geographic location, of the plurality of different geographic locations, in the field;

predicting a respective predictive machine travel speed value corresponding to each geographic location, of a set of geographic locations of the plurality of different geographic locations in the field, based on a value of the first agricultural characteristic in the information map corresponding to the first geographic location in the field, based on the value of the second agricultural characteristic detected by the in-situ sensor corresponding to the first geographic location in the field, and based on a respective value of the first agricultural characteristic in the information map corresponding to each respective geographic location of the set of geographic locations of the plurality of different geographic locations in the field, wherein each respective geographic location, of the set of geographic locations of the plurality of different geographic locations, is different from the first geographic location in the field; and controlling a controllable subsystem on the agricultural work machine based on the respective predictive machine travel speed value corresponding to at least one geographic location of the set of geographic locations.

12. The computer implemented method of claim 11, and further comprising:

identifying a relationship between the first agricultural characteristic and the second agricultural characteristic based on the value of the first agricultural characteristic in the information map corresponding to the first geographic location and based on the value of the second agricultural characteristic detected by the in-situ sensor corresponding to the first geographic location, wherein predicting the respective predictive machine travel speed value corresponding to each geographic location, of the set of geographic locations of the plurality of different geographic locations in the field, comprises predicting the respective predictive machine travel speed value corresponding to each geographic location, of the set of geographic locations of the plurality of different geographic locations in the field, based on the identified relationship between the first agricultural characteristic and the second agricultural characteristic and based on the value of the first agricultural characteristic in the information map corresponding to each geographic location, of the set of geographic locations of the plurality of different geographic locations in the field.

13. The computer implemented method of claim 11, wherein controlling the controllable subsystem comprises controlling, as the controllable subsystem, a propulsion subsystem of the agricultural work machine.

14. The computer implemented method of claim 11, wherein controlling the controllable subsystem comprises controlling, as the controllable subsystem, an actuator of the agricultural work machine to control a header of the agricultural work machine or to control a component of the header of the agricultural work machine.

15. The computer implemented method of claim 11, wherein controlling the controllable subsystem comprises controlling, as the controllable subsystem, a residue subsystem of the agricultural work machine.

16. The computer implemented method of claim 11, wherein controlling the controllable subsystem comprises controlling, as the controllable subsystem, a cleaning subsystem of the agricultural work machine.

17. The computer implemented method of claim 11, wherein the second agricultural characteristic comprises a speed characteristic indicative of a travel speed of the agricultural work machine, and the in-situ sensor on the agricultural work machine is configured to detect, as the value of the second agricultural characteristic, a value of the speed characteristic indicative of the travel speed of the agricultural work machine corresponding to the first geographic location in the field.

18. An agricultural work machine configured to perform an operation at a field comprising:

a communication system that receives an information map that includes values of a first agricultural characteristic corresponding to a plurality of different geographic locations in the field, the information map generated based on data collected prior to the operation at the field;

a geographic position sensor that detects a geographic location of the agricultural work machine;

an in-situ sensor that detects a value of a second agricultural characteristic corresponding to a first geographic location, of the plurality of different geographic locations, in the field;

one or more processors; and a data store that stores computer executable instructions that, when executed by the one or more processors, configure the one or more processors to:

identify a relationship between the first agricultural characteristic and the second agricultural characteristic based on the value of the first agricultural characteristic in the information map corresponding to the first geographic location and based on the value of the second agricultural characteristic detected by the in-situ sensor corresponding to the first geographic location; and predict a respective predictive machine speed value corresponding to each geographic location, of a set of geographic locations of the plurality of different geographic locations in the field, based on the identified relationship and based on a respective value of the first agricultural characteristic in the information map corresponding to each geographic location, of the set of geographic locations of the plurality of different geographic locations in the field, wherein each respective geographic location of the plurality of different geographic locations is different from the first geographic location in the field, and wherein each respective predictive machine speed value is indicative of a respective predictive travel speed of the agricultural work machine; and control a controllable subsystem on the agricultural work machine during the operation at the field.

19. The agricultural work machine of claim 18, wherein the second agricultural characteristic comprises a speed characteristic indicative of a travel speed of the agricultural work machine, and the in-situ sensor on the agricultural work machine is configured to detect, as the value of the second agricultural characteristic, a value of the speed characteristic indicative of the travel speed of the agricultural work machine corresponding to the first geographic location in the field.

20. The agricultural work machine of claim 19, wherein the information map comprises one of:

a vegetative index map that includes, as the values of the first agricultural characteristic, vegetative index (VI) values corresponding to the plurality of different geographic locations in the field;

a biomass map that includes, as the values of the first agricultural characteristic, biomass values corresponding to the plurality of different geographic locations in the field;

a topographic map that includes, as the values of the first agricultural characteristic, values of a topographic characteristic corresponding to the plurality of different geographic locations in the field;

a yield map that includes, as the values of the first agricultural characteristic, yield values corresponding to the plurality of different geographic locations in the field;

a soil property map that includes, as the values of the first agricultural characteristic, values of a soil property corresponding to the plurality of different geographic locations in the field;

a seeding characteristic map that includes, as the values of the first agricultural characteristic, values of a seeding characteristic corresponding to the plurality of different geographic locations in the field; or a crop state map that includes, as values of the first agricultural characteristic, crop state values corresponding to the plurality of different geographic locations in the field.

* * * * *